US012621621B2

(12) United States Patent
Wang et al.

(10) Patent No.: US 12,621,621 B2
(45) **Date of Patent: *May 5, 2026**

(54) ADAPTIVE PANNER OF AUDIO OBJECTS

(71) Applicants: DOLBY LABORATORIES LICENSING CORPORATION, San Francisco, CA (US); DOLBY INTERNATIONAL AB, Dublin (IE)

(72) Inventors: Jun Wang, Beijing (CN); Giulio Cengarle, Barcelona (ES); Juan Felix Torres, Darlinghurst (AU); Daniel Arteaga, Barcelona (ES)

(73) Assignees: DOLBY LABORATORIES LICENSING CORPORATION, San Francisco, CA (US); DOLBY INTERNATIONAL AB, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/535,192

(22) Filed: Dec. 11, 2023

(65) Prior Publication Data

US 2024/0179485 A1 May 30, 2024

Related U.S. Application Data

(63) Continuation of application No. 17/833,761, filed on Jun. 6, 2022, now Pat. No. 11,843,930, which is a (Continued)

(30) Foreign Application Priority Data

Mar. 22, 2016 (ES) ................................ ES201630341
Jul. 27, 2016 (EP) ...................................... 16181436

(51) Int. Cl.
*H04S 3/00* (2006.01)
*H04R 5/02* (2006.01)
(Continued)

(52) U.S. Cl.
CPC ................ *H04S 3/002* (2013.01); *H04S 7/30* (2013.01); *H04S 7/302* (2013.01); *H04S 7/308* (2013.01);
(Continued)

(58) Field of Classification Search
CPC . H04S 3/002; H04S 7/30; H04S 7/302; H04S 7/308; H04S 2400/11; H04S 2400/13; H04S 2420/03; H04R 5/02; H04R 5/04
(Continued)

(56) References Cited

U.S. PATENT DOCUMENTS 9,949,052 B2 4/2018 Wang
10,405,120 B2 9/2019 Wang
(Continued)

FOREIGN PATENT DOCUMENTS

JP 2015080119 4/2015
WO 2013181272 12/2013
(Continued)

OTHER PUBLICATIONS

Bucar, Dejan "Reducing Interrupt Latency Using the Cache" Master's Thesis in Electrical Engineering Stockholm, Jan. 31, 2001, pp. 1-43.
(Continued)

*Primary Examiner* — Paul Kim

(57) ABSTRACT

An audio object including audio content and object metadata is received. The object metadata indicates an object spatial position of the audio object to be rendered by audio speakers in a playback environment. Based on the object spatial position and source spatial positions of the audio speakers, initial gain values for the audio speakers are determined. The initial gain values can be used to select a set of audio speakers from among the audio speakers. Based on the object spatial position and a set of source spatial positions at
(Continued)

which the set of audio speakers are respectively located in the playback environment, a set of non-negative optimized gain values for the set of audio speakers is determined. The audio object at the object spatial position is rendered with the set of optimized gain values for the set of audio speakers.

3 Claims, 12 Drawing Sheets

Related U.S. Application Data continuation of application No. 17/149,683, filed on Jan. 14, 2021, now Pat. No. 11,356,787, which is a continuation of application No. 16/555,126, filed on Aug. 29, 2019, now Pat. No. 10,897,682, which is a continuation of application No. 15/647,121, filed on Jul. 11, 2017, now Pat. No. 10,405,120, which is a continuation of application No. 15/451,241, filed on Mar. 6, 2017, now Pat. No. 9,949,052.

(60) Provisional application No. 62/345,602, filed on Jun. 3, 2016.

(51) Int. Cl.
*H04R 5/04* (2006.01)
*H04S 7/00* (2006.01)

(52) U.S. Cl.
CPC .................. *H04R 5/02* (2013.01); *H04R 5/04* (2013.01); *H04S 2400/11* (2013.01); *H04S 2400/13* (2013.01); *H04S 2420/03* (2013.01)

(58) Field of Classification Search
USPC .......................................................... 381/303
See application file for complete search history.

(56) References Cited

U.S. PATENT DOCUMENTS

| | | | | |
|---|---|---|---|---|
| 10,897,682 | B2 | 1/2021 | Wang | |
| 11,356,787 | B2 | 6/2022 | Wang | |
| 11,843,930 | B2 * | 12/2023 | Wang | H04S 7/30 |
| 2008/0013746 | A1 | 1/2008 | Reichelt | |
| 2011/0013790 | A1 | 1/2011 | Hilpert et al. | |
| 2011/0081023 | A1 | 4/2011 | Raghuvanshi | |
| 2012/0057715 | A1 | 3/2012 | Johnston | |
| 2013/0142341 | A1 | 6/2013 | Del Galdo | |
| 2014/0016802 | A1 | 1/2014 | Sen | |
| 2014/0050325 | A1 | 2/2014 | Norris | |
| 2015/0146873 | A1 | 5/2015 | Chabanne | |
| 2015/0221313 | A1 | 8/2015 | Purnhagen et al. | |
| 2015/0319530 | A1 | 11/2015 | Kalevi | |
| 2015/0332663 | A1 | 11/2015 | Jot | |
| 2016/0127847 | A1 * | 5/2016 | Shi | H04S 7/308 381/23 |
| 2016/0295343 | A1 | 10/2016 | Tsingos | |
| 2018/0160250 | A1 | 6/2018 | Yamamoto | |

FOREIGN PATENT DOCUMENTS

| | | |
|---|---|---|
| WO | 2014/147442 | 9/2014 |
| WO | 20140159272 | 10/2014 |
| WO | 20150017037 | 2/2015 |
| WO | 20150054033 | 4/2015 |
| WO | 20150080967 | 6/2015 |
| WO | 20150105748 | 7/2015 |
| WO | 20150150480 | 10/2015 |
| WO | 20170027308 | 2/2017 |

OTHER PUBLICATIONS

ITU-R BS.2051-0 "Advanced Sound System for Programme Production" Feb. 2014, pp. 1-14.
Jeon, Se-Woon et al "Virtual Source Panning Using Multiple-Wise Vector Base in the Multispeaker Stereo Format" 18th European Signal Processing Conference, Aalborg, Denmark, Aug. 23-27, 2010, pp. 1337-1341.
Lee, D.D. et al Algorithms for Non-Negative Matrix Factorization in Advances in Neural and Information Processing Systems 13, pp. 556-562, 2001.
Cichocki, A. et al "Nonnegative Matrix and Tensor Factorizations: Applications to Exploratory Multi-way Data Analysis and Blind Source Separation", Wiley 2009 205 pages.

* cited by examiner

ADAPTIVE PANNER OF AUDIO OBJECTS

CROSS-REFERENCE TO RELATED APPLICATIONS

This application is continuation of U.S. patent application Ser. No. 17/833,761, filed Jun. 6, 2022, which is a continuation of U.S. patent application Ser. No. 17/149,683, filed on Jan. 14, 2021, now U.S. Pat. No. 11,356,787 which is a continuation of U.S. patent application Ser. No. 16/555,126, filed on Aug. 29, 2019, now U.S. Pat. No. 10,897,682, which is continuation of U.S. patent application Ser. No. 15/647,121, filed on Jul. 11, 2017, now U.S. Pat. No. 10,405,120, issued on Sep. 3, 2019, which is continuation of U.S. patent application Ser. No. 15/451,241, filed on Mar. 6, 2017, now U.S. Pat. No. 9,949,052, issued on Apr. 17, 2018, which claims priority to U.S. Provisional Application No. 62/345,602, filed on Jun. 3, 2016, European Patent Application No. 16181436.3, filed on Jul. 27, 2016 and Spanish Patent Application No. P201630341, filed on Mar. 22, 2016, each of which is incorporated by reference in its entirety.

TECHNOLOGY

Example embodiments disclosed herein relate generally to processing audio data, and more specifically, to adaptive panner of audio objects including dynamic audio objects and static audio objects.

BACKGROUND

Input audio content such as originally authored/produced audio content, and the like, may include a large number of audio objects individually represented in an object-based audio format such as Dolby ATMOS® to help create a spatially diverse, immersive and accurate audio experience. Audio playback systems such as those used by cinemas and home theaters are also becoming increasingly versatile and complex, evolving from 5.1 to 7.1, then from 5.1.2 to 7.1.4, then 22.2 (e.g., as defined in ITU-R BS.2051-0), the content of which is incorporated herein by reference in its entirety, among others. As audio source layouts (or audio speaker layouts) transition from planar two-dimensional (2D) arrays to three-dimensional (3D) arrays with elevated speakers and increasing audio channels, reproducing sounds in a playback environment is becoming increasingly complex.

In content creation as well as end user content consumption, speaker positions might be presumed to be in compliance with a standard audio source layout's recommended specification. This presumption, however, can be incorrect in the real world. For example, in a home theater, speakers such as surround speakers are often located at non-standard positions despite the standard audio source layout's recommended specification. As a result, spatial distortion can occur in audio rendering if the audio rendering is based on a presumption that the speakers are located at the standard positions.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The example embodiments are illustrated by way of example, and not by way of limitation, in the figures of the accompanying drawings and in which like reference numerals refer to similar elements and in which.

DESCRIPTION OF EXAMPLE EMBODIMENTS

Figure 1:
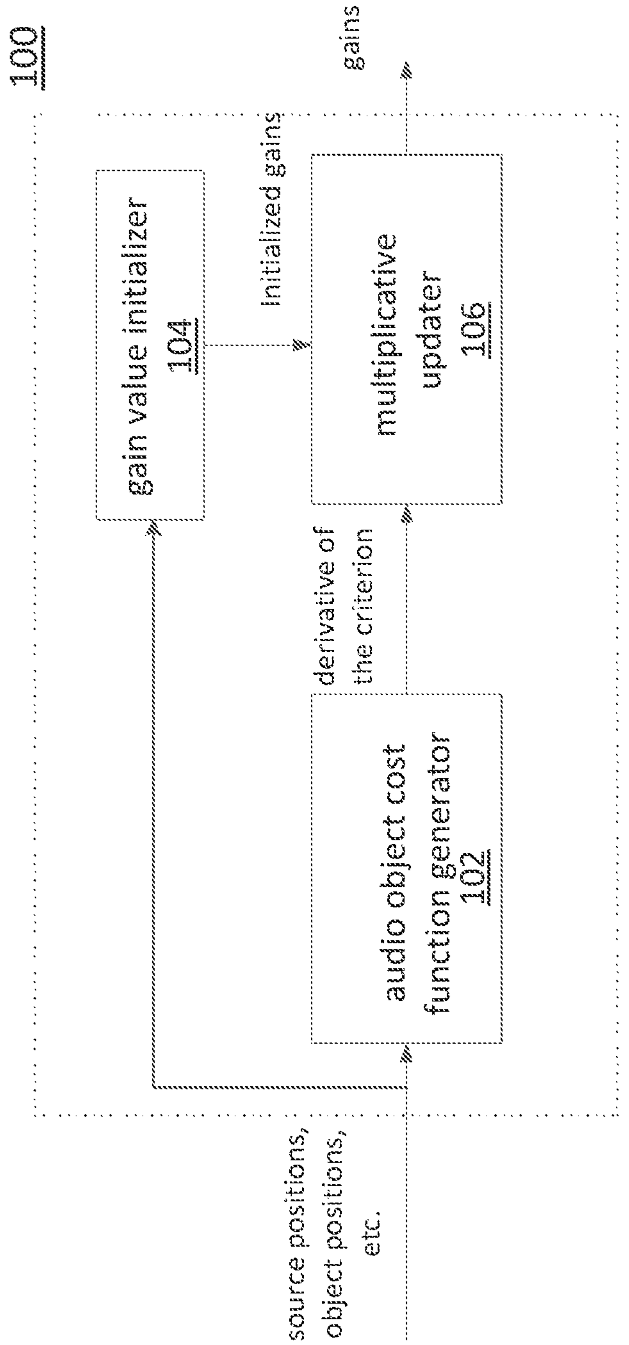
FIG. 1 and FIG. 2 illustrate one or more example system frameworks of one or more gain optimizers in accordance with example embodiments described herein.

Example embodiments, which relate to adaptive panner of audio objects, are described herein. In the following description, for the purposes of explanation, numerous specific details are set forth in order to provide a thorough understanding of the example embodiments. It will be apparent, however, that the example embodiments may be practiced without these specific details. In other instances, well-known structures and devices are not described in exhaustive detail, in order to avoid unnecessarily occluding, obscuring, or obfuscating the example embodiments.

Example embodiments are described herein according to the following outline:

1. General Overview
2. Audio Objects and Audio Source Gains
3. Example Gain Optimizations
4. Example Gain Optimizers
5. Precomputing Gain Values in Offline Processing
6. Activating and Deactiving Audio Sources
7. Sparseness Settings
8. Example Actual Audio Source Layouts 9. Adaptive Audio Source Layout
10. Example Process Flow
11. Implementation Mechanisms—Hardware Overview
12. Equivalents, Extensions, Alternatives and Miscellaneous

1. General Overview

This overview presents a basic description of some aspects of the example embodiments described herein. It should be noted that this overview is not an extensive or exhaustive summary of aspects of the example embodiments. Moreover, it should be noted that this overview is not intended to be understood as identifying any particularly significant aspects or elements of the embodiment, nor as delineating any scope of the embodiment in particular, nor in general. This overview merely presents some concepts that relate to the example embodiment in a condensed and simplified format, and should be understood as merely a conceptual prelude to a more detailed description of example embodiments that follows below.

Example embodiments described herein relate to adaptive panner of audio objects. An audio object including audio content and object metadata is received. Examples of audio objects may include, but are not necessarily limited to only, any of: audio objects that are defined in a manner independent of any specific audio source layout, audio objects that represent audio channels of a specific audio source layout (e.g., a left audio channel or a right audio channel in a stereo audio source layout, a left front audio channel or a right front audio channel in a surround sound audio source layout, among others) that may be treated as static objects located at expected canonical positions of the audio channels (or speakers) in the specific audio source layout. The object metadata of the audio object indicates an object spatial position of the audio object to be rendered by a plurality of audio speakers in a playback environment. Each audio speaker in the plurality of audio speakers is located in a respective source spatial position in a plurality of source spatial positions in the playback environment. Based on the object spatial position of the audio object and the plurality of source spatial positions of the plurality of audio speakers, a plurality of initial gain values for the plurality of audio speakers is determined. Each audio speaker in the plurality of audio speakers is assigned with a respective initial gain value in the plurality of initial gain values. The plurality of initial gain values is used to select a set of audio speakers from among the plurality of audio speakers. Based on the object spatial position of the audio object and a set of source spatial positions at which the set of audio speakers are respectively located in the playback environment, a set of optimized gain values is determined for the set of audio speakers. The audio object at the object spatial position is caused to be rendered with the set of optimized gain values for the set of audio speakers. Each audio speaker in the set of audio speakers being assigned with a respective optimized gain value in the plurality of optimized gain values.

In some example embodiments, mechanisms as described herein form a part of a media processing system, including, but not limited to, any of: an audio video receiver, a home theater system, a cinema system, a game machine, a television, a set-top box, a tablet, a mobile device, a laptop computer, netbook computer, desktop computer, computer workstation, computer kiosk, various other kinds of terminals and media processing units, and the like.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

Any of embodiments as described herein may be used alone or together with one another in any combination. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

2. Audio Objects and Audio Source Gains

Techniques as described herein can be applied to support audio source layouts with arbitrary positions at which audio speakers positions may be (e.g., actually, virtually, etc.) located. These techniques can be implemented by a wide variety of media processing systems including but not limited to audio video receivers (AVRs), etc., some of which could be embedded systems with severe or stringent constraints in CPU power, memory space, I/O speed, and the like.

As compared with other audio rendering methods, techniques as described herein provide an audio object rendering method that is highly flexible, configurable, and adaptable, with different audio source layouts in different playback environments. Under the techniques as described herein, representations by interior objects (e.g., audio objects located in a small spatial volume contained inside the convex hull of the audio speakers) can be made with optimized gain values. In addition, calculation of the optimized gain values under the techniques as described herein do not require any previous geometrical construction (triangulation) as some other approaches (e.g., vector base amplitude panning (VBAP), among others) do. For example, the audio object rendering method can adopt a solution with complete flexibility with respect to spatial positions of audio speakers (e.g., loudspeakers, audio sources, etc.), can take advantage of system resources while avoiding adverse impacts of resource constraints (e.g., embedded resource constraints, etc.). Consequently, the audio object rendering under the techniques as described herein leads to better listening experiences, for example, in irregular audio source layouts.

As used herein, the term "audio object" (or simply "object") refers to a combination of audio content (or audio signal) and object metadata (e.g., spatial positional metadata, etc.). The audio content and the object metadata may be created without reference to (or regardless of) any particular playback environment or audio source layouts therein that is to actually render the audio object. Examples of audio content may include, but are not necessarily limited to only, any of: audio frames, audio data blocks, audio samples, and the like. Examples of spatial positional metadata in the object metadata may include, but are not necessarily limited to only, any of: spatial positions (e.g., linear positions, angular positions, etc.), spatial velocities (e.g., linear velocities, angular velocities, etc.), spatial accelerations (e.g., linear accelerations, angular accelerations, etc.), spatial trajectories, and the like, in connection with an audio object.

As used herein, the term "audio sources" (or simply "sources") refers to audio speakers, audio speaker clusters, audio speaker groups, and the like, in a playback environment for which audio channel data generated by an adaptive audio playback system based on audio objects is to be rendered. As used herein, the term "rendering" may refer to a process of transforming audio objects into audio channel data (1) to be used to directly drive the audio sources of the adaptive audio playback system for rendering, or (2) to be transmitted/delivered to a recipient audio rendering system for rendering. The audio channel data, which represents the audio objects in the specific playback environment, may be audio content data adapted for a specific audio source layout in the specific playback environment. In some example embodiments, the audio channel data may be compressed/encoded/packaged (e.g., by the adaptive audio playback system, by an audio encoder, etc.) in an efficient form for transmission/delivery to a downstream recipient audio rendering system for driving audio sources of a specific audio source layout in connection with the downstream recipient audio rendering system. The recipient audio rendering system may be local or remote to the adaptive audio playback system or the audio encoder that generates the audio channel data.

An adaptive audio playback system as described herein may receive or otherwise determine source configuration data for a specific audio source layout in a specific playback environment such as a movie theater, a concert hall, a theme park, a home, an office, a theater, a restaurant, a bar, and the like. As used herein, the term "source configuration data" may include location data indicating (source spatial) positions of some or all of audio speakers in a playback environment. For example, the source configuration data may define or specify a respective source spatial location for each audio source of a plurality of audio sources in the specific playback environment. A source spatial location as described herein may be provided as spatial coordinates of a spatial location of an audio source in a coordinate system such as one related to Cartesian coordinates, spherical coordinates, angular coordinates, and the like. The spatial coordinates can be defined relative to a reference location in the specific playback environment, such as a spatial location of a specific audio source in the specific playback environment, and the like. In some embodiments, each audio source in the plurality of audio sources may correspond to one or more audio speakers of the specific playback environment.

The adaptive audio playback system as described herein may receive one or more audio objects each of which comprises one or more respective audio content (e.g., respective audio signals) and respective object metadata (including but not limited to spatial positional metadata). Spatial positional metadata of an audio object may comprise a plurality of (e.g., time-varying, time-constant, etc.) object spatial locations of the audio object in a coordinate system (which may be the same coordinate system used to represent audio sources). The plurality of object spatial locations of the audio object may be a function of time, and may represent or indicate a spatial trajectory of the audio object in the spatial volume such as represented in the specific playback environment. More specifically, the adaptive audio playback system can be configured to translate the spatial positional metadata of the audio object into the spatial trajectory of the audio object in the spatial volume as represented in the specific playback environment.

When the audio object is rendered or played back in a specific playback environment, the audio object may be rendered in the specific playback environment according to at least the spatial positional metadata of the audio object and the source configuration data of the specific audio source layout. A process of rendering the audio object by the adaptive audio playback system may involve determining a respective (e.g., time-varying, time-constant, etc.) contribution (e.g., as represented by a gain value, etc.) from each audio source of the plurality of audio sources in the specific playback environment, based at least in part on the source spatial data of the specific audio source layout in the specific playback environment and the object spatial data of the audio object. In some embodiments, a contribution of an audio source in the plurality of audio sources for rendering the audio object may be represent by an audio object gain (e.g., gain, gain value, etc.) that is assigned to or determined for the audio source.

Determination of individual contributions from, or individual gains for, audio sources in the plurality of audio sources in the specific playback environment for the purpose of rendering the audio object can be made in one or more of a variety of methods. In some example embodiments, the adaptive audio playback system may determine the individual gains based on minimizing or optimizing an audio object cost function of which the individual gains are variables that form a search space, and (source) spatial positions of the audio sources in the specific playback environment are (e.g., input) parameters. Additionally, optionally, or alternatively, the adaptive audio playback system may incorporate one or more regularization terms in favor of a certain optimization solution among a large number of possible solutions.

For the purpose of illustration only, in some embodiments, gain optimization can be performed through an inverse-matrix method, a multiplicative-update method, or some other iterative method. Various embodiments include using gain optimization methods other than the inverse-matrix method, the multiplicative-update method, and the like. For example, in some embodiments, instead of using an inverse-matrix method to generate nonnegative and/or negative initial gain values, a different gain optimization method that can generate nonnegative and/or negative initial gain values may be used instead of, or in conjunction with, the inverse-matrix method. For example, a quadratic programming method that does not implement a nonnegativity constraint may be used to generate nonnegative and/or negative initial gain values. Additionally, optionally, or alternatively, in some embodiments, instead of using a multiplicative-update method to maintain nonnegativity of updated gain values, a different gain optimization method that can maintain nonnegativity of updated gain values may be used instead of, or in conjunction with, the multiplicative-update method. In an example, a quadratic programming method (e.g., implemented as a function in a third party extension of MATLAB such as pdco( ) etc.) that implements a nonnegativity constraint may be used to update gain values and maintain nonnegativity of the updated gain values. In another example, an interior point optimizer (e.g., implemented in the software library Interior Point OPTimizer, or IPOPT) may be used to update gain values and maintain nonnegativity of the updated gain values. Such a method may, but is not necessarily limited to only, be implemented as an iterative method, a recursive method, and the like.

3. Example Gain Optimizations

Let $g.\tilde{g}$ denote the element-wise product of two 1×N vectors g and $\tilde{g}$. Let $g^{-1}$ denote a vector in which the i-th element is equal to the inverse $$g_i^{-1}$$

of the i-th element ($g_i$) of a 1×N vector g.

By way of example but not limitation, the adaptive audio playback system may implement a Center of Mass Amplitude Panning (CMAP) paradigm that determines the individual gains for the audio sources based on minimizing/optimizing an audio object cost function (or objective function). In an example embodiment, such an audio object cost function may be given as follows:

$$E = E_{CL} + E_{distance} + E_{sum\text{-}to\text{-}one} \tag{1}$$

where each term or criterion is given as follows:

$$E_{CL} = [(\Sigma_i g_i)\vec{r}_s - \Sigma_i g_i \vec{r}_i]^2 \tag{2}$$

$$E_{distance} = \alpha_{distance} \Sigma_i g_i^2 (\vec{r}_s - \vec{r}_i)^2 \tag{3}$$

$$E_{sum\text{-}to\text{-}one} = \alpha_{sum\text{-}to\text{-}one} [\Sigma_i g_i - 1]^2 \tag{4}$$

where $r_s$ represents the (object) spatial position of the audio object; $r_i$ represent the (source) spatial positions of the audio sources; $g_i$ represent the individual gains of the audio sources; $E_{CL}$ is a term in favor of representing the audio object at a center of loudness of the audio sources; $E_{distance}$ is a constraint term for penalizing activating those audio sources (e.g., firing audio speakers, etc.) that are far from the audio object with its weight, $\alpha_{distance}$ (e.g., set to 0.01, 0.02, etc.); $E_{sum\text{-}to\text{-}one}$ is another constraint term for restricting the magnitudes/values of the gains to unit sum with its weight, $\alpha_{sum\text{-}to\text{-}one}$ (e.g., set to 1, 1.1, etc.).

Techniques as described herein can be applied to deriving optimal representation of audio objects by audio sources in a wide variety of possible audio source layouts. These techniques can be used to prevent audible artifacts, spatial distortion, instability (e.g., with negative gains for the audio sources), and the like. While an audio object cost function that includes terms such as the center-of-loudness term, the constraint terms, and the like, may be used to determine gains for audio sources, other audio object cost functions may also be used instead of or in addition to the audio object cost function as described herein. Additionally, alternatively or optionally, other terms for other regularization purposes may also be used instead of or in addition to the center-of-loudness term, the constraint terms, and the like, as given above.

The audio object cost function in expression (1) may be represented in a matrix notation as follows:

$$E(g) = g^T A' g + B^T g + C, \tag{5}$$

where A' represents a matrix including matrix elements/components denoted as $A_{ij}'$, B represents a vector including vector elements/components denoted as $B_i$, and C represents a constant, as follows:

$$A'_{ij} = \left[r_s^2 + \vec{r}_i \cdot \vec{r}_j - \vec{r}_s \cdot (\vec{r}_i + \vec{r}_j)\right] + \alpha_{distance}(\vec{r}_s - \vec{r}_i)^2 \delta_{ij} + \alpha_{sum\text{-}to\text{-}one} \tag{6}$$

$$B_i = -2\alpha_{sum\text{-}to\text{-}one} \tag{7}$$

$$C = \alpha_{sum\text{-}to\text{-}one} \tag{8}$$

The above expression may also be rewritten as follows:

$$E(g) = \frac{1}{2} g^T A g + B^T g + C \tag{9}$$

where A represents a symmetric matrix that can be derived from the matrix A' and the transpose of $A'^T$ as follows:

$$A = A' + A'^T \tag{10}$$

From expression (5) above, a derivative ∇E (g) (or a gradient in a search space formed by gains) of the audio object cost function E ( . . . |g) can be obtained with respect to g as follows:

$$\nabla E(g) = Ag + B \tag{11}$$

In some embodiments, the adaptive audio playback system may use an inverse-matrix method to determine optimized values of the gains as follows:

$$Ag + B = 0 \rightarrow g = -A^{-1}B \tag{12}$$

A center of loudness, CL, of the audio sources for the purpose of representing the audio object can be defined as the weighted sum of the spatial positions of the audio sources as weighted by respective gains of the audio sources as follows:

$$CL = \Sigma_i g_i \vec{r}_i / \Sigma_i g_i \tag{13}$$

In many operational scenarios, the center of loudness of the audio sources for the purpose of representing the audio object does not always lie inside the convex hull of the audio sources. For example, (e.g., all) speakers in the specific playback environment that constitute audio sources may be located in a relatively small region of a room. It may not be possible to obtain a center of loudness to match a spatial position of the audio object outside that small region, unless negative gains are used. Accordingly, the inverse-matrix method as represented by expression (12) may lead to nonnegative gains as well as negative gains for audio sources (or negative speaker gains).

As used herein, an audio source that uses a positive gain in rendering an audio object tends to pull the audio object spatially close to the audio source. In contrast, an audio source that uses a negative gain in rendering an audio object tends to push the audio object spatially away from the audio source. Negative gains may cause audible artifacts, spatial distortions, instability, and other similarly undesirable effects in rendering audio objects.

If these negative gains are set to zero, discontinuity may be observed on the border of the convex hull formed by the audio sources. For example, sound signals generated by audio sources (or audio speakers) have drop-ins and outs each time when the audio object crosses the convex hull, introducing audible artifacts and spatial distortions.

In some example embodiments, instead of or in addition to using the inverse-matrix method, the adaptive audio playback system may use a multiplicative-update method to determine optimized values of the gains and to enforce a non-negativity constraint in optimized values computed for gains of audio sources. Under this approach, current values of the gains are obtained by iteratively updating previous values of the gains (which were also ensured to be nonnegative) with a nonnegative multiplier. For the purpose of illustration only, the current values of the gains may be derived from the previous values of the gains with a non-negative multiplier as follows:

$$g \leftarrow \frac{1}{2} g.\left(\sqrt{B.B + 4([A]_+ g).([A]_- g)} - B\right).([A]_+ g)^{-1} \tag{14}$$

where a positive component $[A]_+$ and a negative component $[A]_-$ of a matrix A are respectively defined as follows:

$$[A]_{+ij} = \begin{cases} A_{ij} & \text{if } A_{ij} > 0 \\ 0 & \text{otherwise} \end{cases} \tag{15}$$

$$[A]_{-ij} = \begin{cases} -A_{ij} & \text{if } A_{ij} < 0 \\ 0 & \text{otherwise} \end{cases} \tag{16}$$

Updating gain values (or values of the gains) through an update factor that is a positive multiplier ensures non-negativity in the optimization process of the values of the gains, provided that initial values of the gains are not negative.

The update factor, as represented by expression (14), can be further simplified as follows:

$$g \cdot \{[\nabla E(g)]_- / [\nabla E(g)]_+\}^{\alpha}, \tag{17}$$

where typically $1 \le \alpha \le 2$; and $[\nabla E(g)]_-$ are both nonnegative, and are related in $\nabla E(g)$ as follows:

$$\nabla E(g) = [\nabla E(g)]_+ - [\nabla E(g)]_- \tag{18}$$

$$[\nabla E(g)]_+ = [A]_+ g \text{ and } [\nabla E(g)]_- = -B - [A]_- g \tag{19}$$

In some embodiments, the matrix A (e.g., related to the audio object cost function E(g) in expression (5), etc.) is positive definite; the audio object cost function E(g) in expression (5) is bounded below (e.g., greater than or equal to zero since all terms in expression (5) are nonnegative, etc.) and the optimization of the audio object cost function E(g) is convergent. It is worth noting that while A may be diagonalizable and positive definite, the gains obtained under the inverse-matrix method in expression (12) are not necessarily positive. In contrast, gains obtained under a multiplicative-update method as described herein such as in expressions (14) and (17) remain positive provided the initial values of the gains are positive. In some embodiments, gains obtained under a multiplicative-update method as described herein such as in expressions (14) and (17) remain zero provided the initial values of the gains are zero.

In some discussion herein, it has been described that the multiplicative-update method can be applied to a cost function as given in expression (5). This is for the purpose of illustration only. It should be noted that in various embodiments the multiplicative-update method can also be applied to any of a wide variety of cost or objective functions including but not limited to only the examples given above.

In some other embodiments, the adaptive audio playback system may use an alternate method for optimization to determine optimized values of the gains and to enforce a non-negativity constraint in optimized gain values, such as using a quadratic programming framework with non-negative constraints or a general optimization method, such as IPOPT, which guarantees minimizing a cost function such as expression (1) subject to the constraint $g_i \ge 0$ for all values of i.

Thus, under techniques as described herein, panning of audio objects is determined by solving a minimization/optimization problem with a method that constraints all gain values of audio sources to be non-negative. In some embodiments, two general steps can be used to achieve a final solution to the minimization/optimization problem.

In a first step, a set of initial gain values (or seed gain values) is assigned, determined, and/or calculated. In some cases, the seed gain values are close to the final solution; in some other cases the seed gain values are to be non-negative; in yet other cases there may be no strict requirements for the seed gain values. In various embodiments, the set of initial gain values can be computed via matrix inversion, an iterative method, or even sometimes with a trivial initialization (all gains equal), among others.

In a second step, the constrained minimization/optimization problem can be solved with a multiplicative method, with a quadratic programming (QP) method, an IPOPT method or whatever other method, starting from the seed gain values to compute the non-negative gain values.

In embodiments in which the multiplicative method is used (e.g., to solve the constrained minimization/optimization problem), the two steps above may be particularized as follows. In the first step, the initial gain values (or the seed gain values) can be set reasonably close to the final solution. In an example, gain values (e.g., the initial gain values) for all active loudspeaker should be strictly positive. In some embodiments, gain values from an inverse matrix based solution can be taken with all gains clipped from below a threshold to a small positive value (e.g., a negligible positive value below the threshold). In the second step, these positive gain values (not necessarily optimized) can be optimized to gain values of the final solution through iterative minimization, for example, in accordance with the multiplicative equations/expressions as described herein that ensure non-negative updates of gain values between successive iterations.

4. Example Gain Optimizers

FIG. 1 illustrates an example system framework of a gain optimizer 100, which may be a part of an adaptive audio playback system. The gain optimizer (100) can be used to determine optimized values of gains for an audio object that is to be reproduced or rendered by the adaptive audio playback system. The optimized values of gains may be determined for each spatial position in a plurality of (e.g., discrete) spatial positions that represent a spatial trajectory of the audio object. Different spatial positions in the plurality of spatial positions correspond to different time points in a plurality of time points that span a time interval during which the audio object travels through the spatial trajectory.

In some example embodiments, the gain optimizer (100), which may be implemented by one or more computing devices, includes an audio object cost function generator 102, a gain value initializer 104, and a multiplicative updater 106, In some example embodiments, the audio object cost function generator (102) includes software, hardware, a combination of software and hardware, and the like, configured to receive source configuration data that specifies or defines a specific audio source layout in a specific playback environment. The source configuration data may include but is not necessarily limited to only, any, some or all of: (source) spatial positions of a plurality of audio sources in the specific audio source layouts, room configuration, reference locations, coordinate system information, and the like.

In some embodiments, the audio object cost function generator (102) is configured to receive object configuration data for the audio object, which may be one of one or more audio objects that are to be (e.g., concurrently, serially, partly concurrently, partly serially, etc.) rendered by the plurality of audio sources. As used herein, object configuration data for an audio object includes or specifies one or more spatial positions (which form the spatial trajectory) of the audio object as a function of time, as a time-indexed table, as a time-dependent array, as a time-dependent sequence, etc.

In some embodiments, based on some or all of the source configuration data, the object configuration data and the room configuration, the audio object cost function generator (102) generates a spatial representation of the audio sources and the audio object in the specific playback environment. The audio object cost function generator (102) uses the spatial representation of the audio sources and the audio object in the specific playback environment to generate audio object cost functions (e.g., expression (5), etc.) to be used to determine optimized values for individual gains of the audio sources at each of the spatial positions representing the spatial trajectory of the audio object. For example, based on the source spatial positions of the audio sources, a spatial position of the audio object, etc., in the spatial representation, the audio object cost function generator (102) generates an audio object cost function for that spatial position of the audio object.

In some example embodiments, the gain value initializer (104) comprises software, hardware, a combination of software and hardware, etc., configured to generate initial values (e.g., denoted as "initial gains" in FIG. 1, random initial values, computed initial values, normalized initial values, nonnegative initial values, etc.) of the gains of the audio sources. By way of example but not limitation, the initial gains (or initial gain values) may be set for the spatial position of the spatial positions representing the spatial trajectory of the audio object. Each audio source in the plurality of audio sources in the specific playback environment may be assigned a respective initial value in the initial values generated by the gain value initializer (104) for the spatial position of the audio object.

In some example embodiments, the multiplicative updater (106) includes software, hardware, a combination of software and hardware, and the like, configured to iteratively generate an update factor (e.g., expression (14), and/or expression (17)) from the audio object cost function that is generated by the audio object cost function generator (102) for the spatial position of the audio object. The update factor may include one or more multiplicative factors, zero or more offset factors, etc. The multiplicative updater (106) uses the update factor to derive current values of the gains for the audio sources for the spatial position of the audio object from previous values of the gains for the audio sources for the same spatial position of the audio object, until converged (or optimized) values of the gains for the audio sources for the spatial position of the audio object are obtained. The converged values of the gains are reached, provided that one or more convergent criteria (e.g., differences in gain values between two successive updates become smaller than convergence thresholds (e.g., present_convergence_threshold in TABLE 1), etc.) are satisfied. The multiplicative updater (106) then outputs the converged values (denoted as "gains" in FIG. 1) of the gains for the audio sources that can be used to drive the audio sources in the specific playback environment to represent or render the audio object located at the spatial position.

An example implementation of the multiplicative-update method is shown in TABLE 1 as follows:

TABLE 1

```
// initialize gains with random nonnegative numeric values,
// a gain optimization method, etc.
Initialization: Initialized gains g with non-negative values: g ≥ 0
Iteration:
  for iter = 1:iteration_times, do
    // Update gains using the multiplier in expression (17)
    // e.g., using a modified form of expression (17) as shown below,
    // where α is a power factor for accelerating convergence, and may
    be set
    // within a value range from 1 to 2
    g̃ = g.([∇E(g)]_/[∇E(g)]_+)^α;
    if Δg = Σ_i( g̃_i − g_i)^2 < preset_convergence_threshold
      break;  // gain values converged if less than the threshold
```

In an example embodiment, the update factor is a positive multiplier. For example, the audio object cost function generator (102) may generate a gradient $\nabla E(g)$ (denoted as "the derivative of the criterion" in FIG. 1) from the audio object cost function for the audio object located at the spatial position. The negative and positive parts of the gradient $\nabla E(g)$ (denoted as "the derivative of the criterion" in FIG. 1) may be received or determined by the multiplicative updater (106) and used as input to iteratively generate the positive multiplier (as the update factor), as given in expression (17), for gain optimization related to the spatial position of the audio object at the corresponding time point.

Since the spatial trajectory of the audio object may include a plurality of (e.g., discrete) spatial positions at a plurality of time points, some or all of the operations as described above (e.g., the audio object cost function generation, the gain value initialization, the gain value updates, etc.) may be repeated for any, some or all of these spatial positions of the audio object. In some embodiments, the initial gains are set for each spatial position of the audio object. In some embodiments, the initial gains are set for each group (e.g., every two adjacent spatial positions, every three adjacent spatial positions, etc.) of spatial positions of the audio object. In some embodiments, the initial gains are set only for an initial spatial position. Once the optimized values of the gains for the initial spatial position of the audio object are obtained through the convergence process, the optimized values for the initial spatial position of the audio object may be used as initial values of the gains for the spatial position of the audio object immediately following the initial spatial position of the audio object. Similarly, optimized values for a non-initial spatial position of the audio object may be used as initial values of the gains for the spatial position of the audio object immediately following the non-initial spatial position of the audio object, until optimized values for all spatial positions in the plurality of spatial positions of the audio object are computed.

Figure 2:
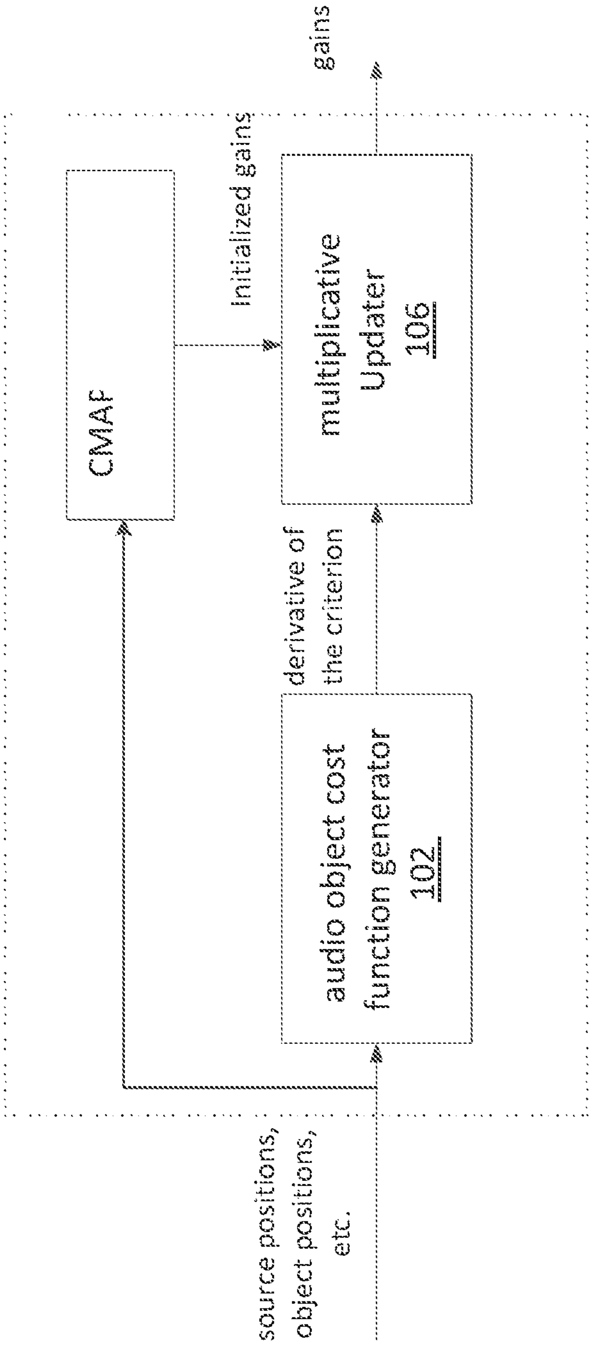

FIG. 2 illustrates an example system framework of a gain optimizer 100-1, which may be a part of an adaptive audio playback system. In the gain optimizer (100-1) of FIG. 2, the gain value initializer (104) in the gain optimizer (100) of FIG. 1 is replaced by or implemented as a CMAP gain value initializer (104-1). In some example embodiments, the CMAP gain value initializer (104-1) includes software, hardware, a combination of software and hardware, and the like, to generate initial values (denoted as "initial gains" in FIG. 2, normalized initial values, nonnegative initial values, etc.) of the gains of the audio sources based at least in part on the CMAP paradigm (e.g., implemented with an inverse matrix). For example, each audio source in the plurality of audio sources in the specific playback environment may be given a respective initial value in the initial values generated by the gain value initializer (104-1) based at least in part on the CMAP paradigm (e.g., implemented with an inverse matrix, the inverse-matrix method, etc.). As the inverse-matrix method may generate negative gains for some audio sources in the plurality of audio sources in the specific playback environment, a half wave rectification type of operation can be performed to replace these negative gains with zeros or negligible small gain values (e.g., 0.001, 0.0001, gain values below a near-zero positive gain value limit, etc.). Since some or all the gains are optimized values under this CMAP approach of initializing gains, it is expected that convergence to optimized (nonnegative) values of the gains can be faster than in an approach that uses random values as initial values.

5. Precomputing Gain Values in Offline Processing

Figure 3:
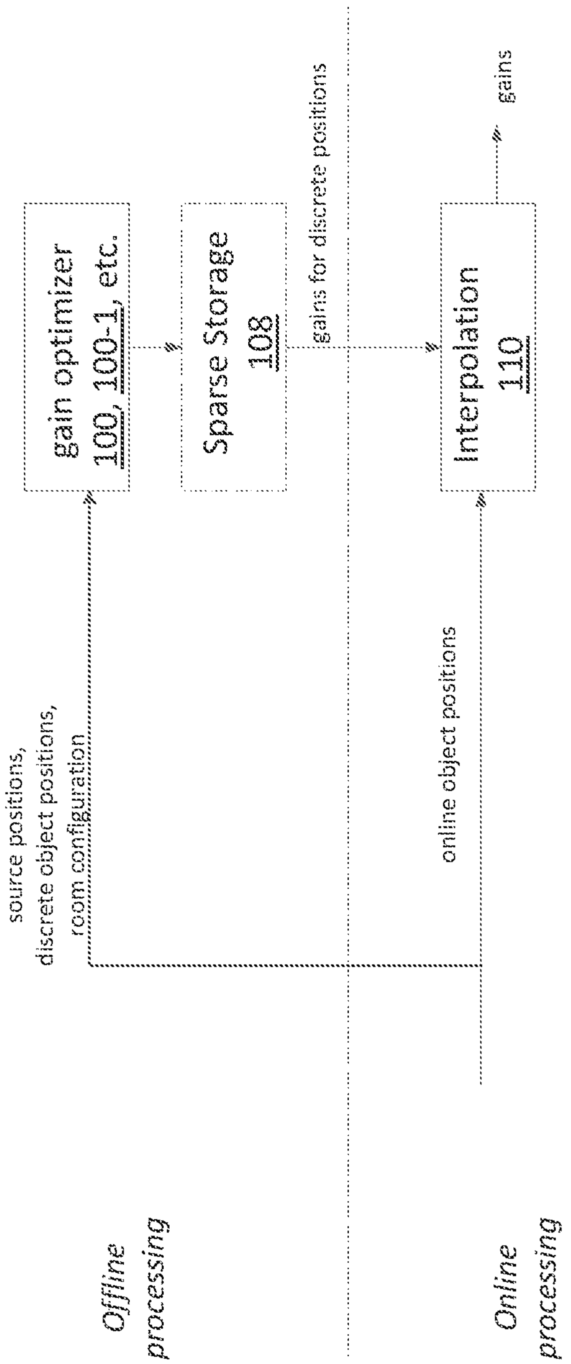
FIG. 3 illustrates an example adaptive audio playback system that uses precomputed gain values for interpolation in accordance with example embodiments described herein.

FIG. 3 illustrates an example adaptive audio playback system that uses precomputed gain values for interpolation. In some embodiments, the adaptive audio playback system includes a gain optimizer (e.g., 100 of FIG. 1, 100-1 of FIG. 2, etc.), a sparse storage 108, and/or an interpolation operator 110. The gain optimizer generates or precomputes a plurality of sets of optimized values of gains for audio sources in a specific audio source layout in a specific playback environment in offline processing.

In some embodiments, the specific playback environment is populated by a plurality of (e.g., discrete) precomputed spatial positions—at which an audio object to be rendered by the adaptive audio playback system may or may not be located. In various embodiments, the plurality of precomputed (object) spatial positions may be distributed in the specific playback environment uniformly or non-uniformly. In some embodiments, more spatial positions may be placed or distributed in certain portions of the specific playback environment than in other portions of the same environment. Additionally, optionally, or alternatively, the plurality of precomputed spatial positions may be distributed in the specific playback environment regularly or irregularly.

Figure 4:
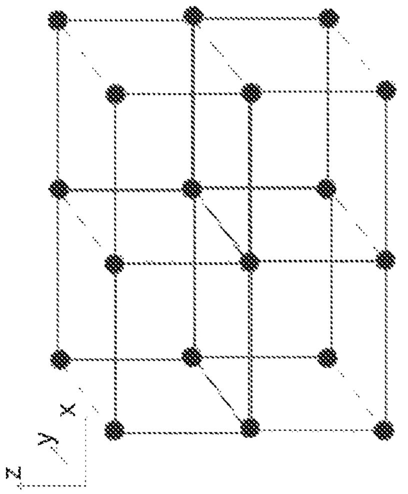
FIG. 4 illustrates discrete object positions at which gain values can be pre-calculated in accordance with example embodiments described herein.

By way of example but not limitation, the specific playback environment may be represented by a three-dimensional (3D) rectangular room of FIG. 4 with discrete spatial positions (e.g., vertices of a grid, lattice points, etc.) at each of which gain values can be pre-calculated. As shown in FIG. 4, the specific playback environment may be logically divided with a grid or lattice (e.g., a regular lattice of 11^3=1331 points, etc.). A plurality of (e.g., discrete) precomputed spatial positions populated in the specific playback environment may be represented by vertices in the lattice or grid. A spatial position in the plurality of spatial positions in the specific playback environment can be defined or specified by a corresponding set of coordinate values (e.g., a set of x, y, and z values, etc.) in a coordinate system (e.g., an X-Y-Z Cartesian coordinate system, etc.).

In some embodiments, the precomputation of the plurality of sets of optimized values of gains for the plurality of precomputed (object) spatial positions in the offline processing is only calculated once, given the specific audio source layout in the specific playback environment. Each set of optimized values of gains in the plurality of sets of optimized values of gains may correspond to a respective precomputed spatial position in the plurality of precomputed spatial positions. More specifically, a set of optimized values of gains (for the audio sources), which corresponds to a respective precomputed spatial position, is precomputed in the offline processing for the respective precomputed spatial position as if an audio object is located at the respective precomputed spatial position.

In some embodiments, the adaptive audio playback system stores the plurality of sets of gains precomputed in the offline processing at the plurality of precomputed spatial positions (denoted as "discrete object positions" in FIG. 3 and FIG. 4) in the sparse storage (108), for example, in the form of a look-up table with the precomputed spatial positions as keys.

In online processing when the adaptive audio playback system is to use the audio sources in the specific playback environment to reproduce or render an actual audio object in the specific playback environment, to reduce computational complexity of the online processing, gain values for actual spatial positions of the actual audio object may be obtained through interpolation based on the optimized values of gains precomputed in the offline processing. More specifically, optimized values of gains for actual spatial positions of the actual audio object may be computed by the interpolation operator (110) through interpolating the optimized values of gains that were precomputed and stored in memory (e.g., in the look-up table, etc.) in the offline processing based on the actual spatial positions of the actual audio object.

In the present example of the grid or lattice as illustrated in FIG. 4, given an actual spatial position of the actual audio object in the online processing, an interpolation such as a trilinear interpolation, etc., can be applied by the interpolation operator (110), which uses optimized values of gains at the neighboring precomputed spatial positions—e.g., one or more precomputed spatial positions that are closest to the actual spatial position of the actual object—of the lattices to derive approximate values of gains (for the audio sources) for reproducing or rendering the actual audio object at the actual spatial position.

In some embodiments, interpolation can be applied to the precomputed values of gains without first performing other operations such as normalization, gating, expanding, clipping, etc. In some embodiments, these other operations may be applied after the interpolation.

6. Activating and Deactiving Audio Sources

Figure 5:
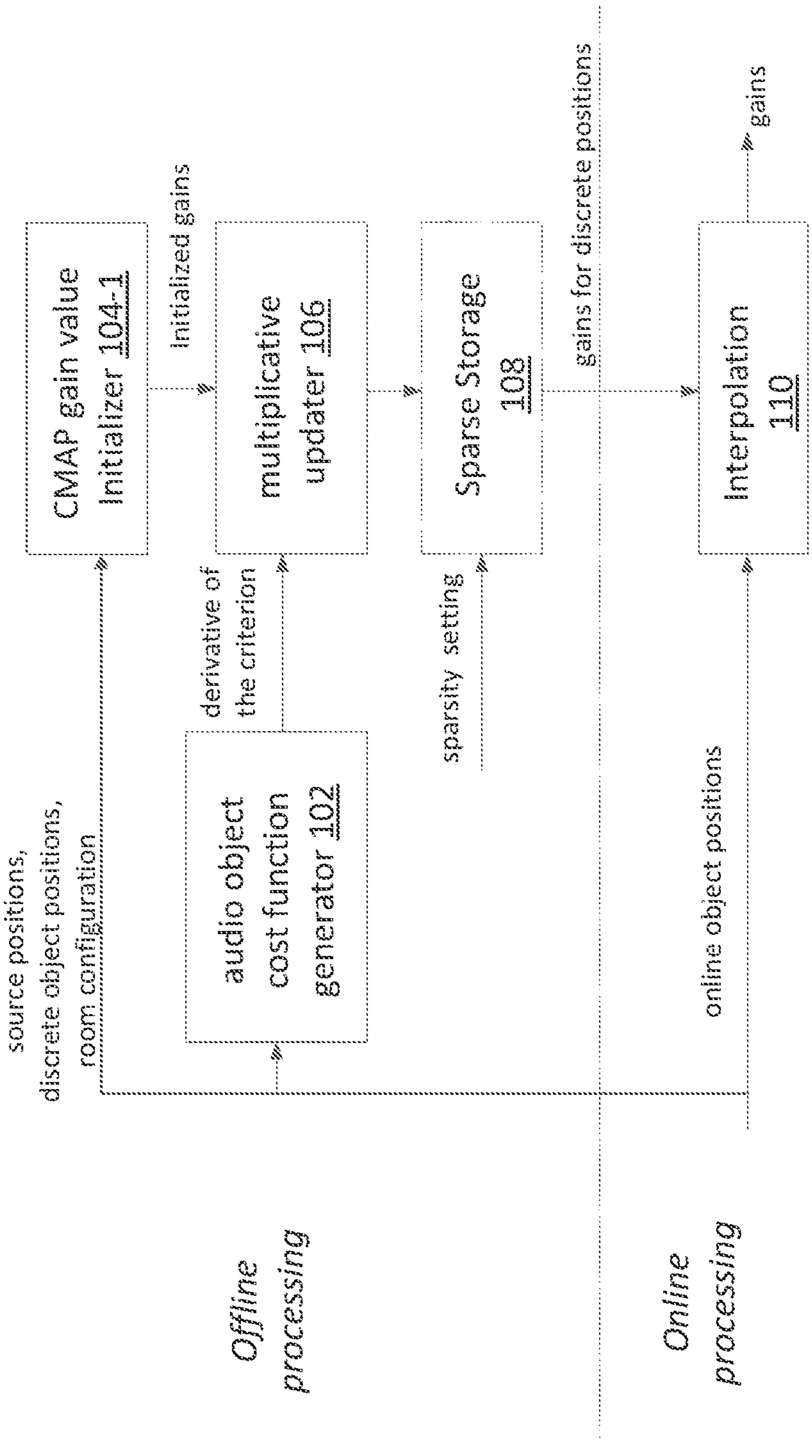
FIG. 5 illustrates an example adaptive audio playback system that determines initial gains based on a first gain optimization method and uses a second gain optimization method to refine a selected group of the initial gains in accordance with example embodiments described herein.

FIG. 5 illustrates an example adaptive audio playback system that determines initial gains based on a first gain optimization method (e.g., the inverse-matrix method, etc.) and uses a second gain optimization method (e.g., the multiplicative-update method) to refine a selected group of the initial gains. The adaptive audio playback system stores refined gains (e.g., precomputed gain values for precomputed spatial positions, optimized values of gains, converged values of gains, etc.) in sparse storage. In some embodiments, the adaptive audio playback system comprises an audio object cost function generator (e.g., 102 of FIG. 1 or FIG. 2, etc.), a CMAP gain value initializer (e.g., 104-1 of FIG. 2, etc.), a multiplicative updater (e.g., 106 of FIG. 1 or FIG. 2, etc.), a sparse storage (e.g., 108, etc.), an interpolation operator (e.g., 110), etc.

In some embodiments, during offline processing, for each precomputed spatial position in a plurality of (e.g., discrete) precomputed spatial positions that are populated in a specific playback environment, the CMAP gain value initializer (104-1) generates optimized gain values for that precomputed spatial position based at least in part on the CMAP paradigm and uses the optimized gain values as (optimized) initial values of the gains of the audio sources as if an audio object is located at that precomputed spatial position. These initial values of gains generated by the CMAP gain value initializer (104-1) for each spatial position may be used to deactivate audio sources (e.g., with negative initial gain values, with negative and zero initial gain values, with initial gain values below a gain value threshold, etc.). The remaining initial gains for the remaining audio sources (or activated audio sources) are refined for the precomputed spatial position by the multiplicative updater (106) until reaching convergence. Converged values (or optimized values) of gains for activated audio sources at each such precomputed spatial position in the plurality of precomputed spatial positions are stored into the sparse storage (108). In some embodiments, the adaptive audio playback system may select, from one or more different sparseness settings, a sparseness setting for populating precomputed spatial positions in the specific playback environment. The sparseness setting may include the total number of precomputed spatial positions, possibly same or different densities of precomputed spatial positions in different portions of a spatial volume represented by the specific playback environment, etc.

Given an actual spatial position of an actual audio object in online processing, an interpolation such as a trilinear interpolation, or the like, can be applied by the interpolation operator (110), which uses optimized values of gains at the neighboring precomputed spatial positions—for example, one or more precomputed spatial positions that are closest to the actual spatial position of the actual object—to derive approximate values of gains (for the audio sources) for reproducing or rendering the actual audio object at the actual spatial position.

7. Sparseness Settings

Consumer devices, such as televisions, audio-video receivers (AVRs), mobile devices, and the like generally have rigorous memory and/or computation limitations. For example, the audio processing capabilities, disk storage space limitations, and the like, of a home theater system will generally not be on par with those of a cinema sound system. Accordingly, some implementations may need to use relatively small amounts of memory, as such some implementations may need to have relatively low computational complexity. Hence, different usage scenarios and applications may need different balances and tradeoffs between memory footprint and computational power (e.g., in terms of computational cost, etc.).

Figure 6:
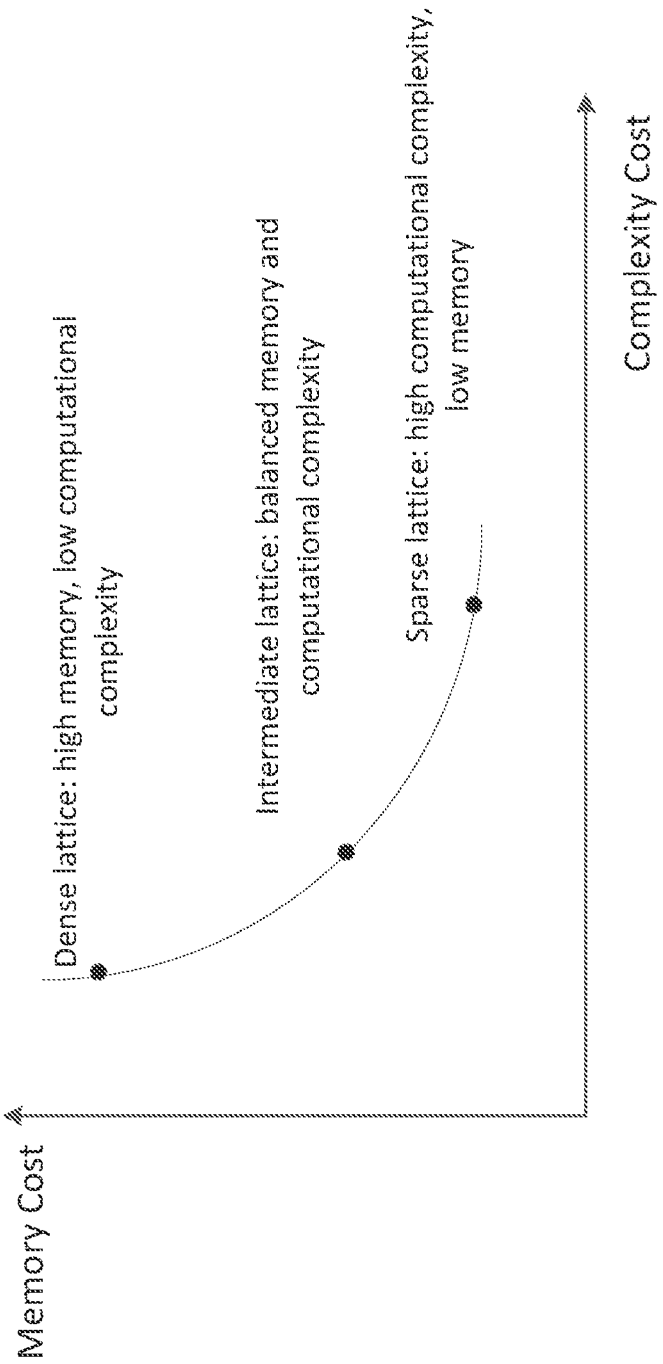
FIG. 6 illustrates an example memory-complexity curve with different sparseness settings in accordance with example embodiments described herein.

Various tradeoffs between computational load and memory space can be made under techniques as described herein. FIG. 6 illustrates an example memory-complexity curve with different sparseness settings. As illustrated in FIG. 6, the amount of memory space or data storage in the sparse storage (108) can be reduced by using a sparseness setting that decreases the number of precomputed spatial positions in a spatial construct (e.g., a lattice, a grid, etc.) that divides a spatial volume represented by a specific playback environment; under such a sparseness setting, the approximated or interpolated values of gains may become less accurate. Conversely, the amount of memory space or data storage in the sparse storage (108) can be added by using a sparseness setting that increases the number of precomputed spatial positions in a spatial construct (e.g., a lattice, a grid, etc.) that divides a spatial volume represented by a specific playback environment; under such a sparseness setting, the approximated or interpolated values of gains may become more accurate.

Figure 7:
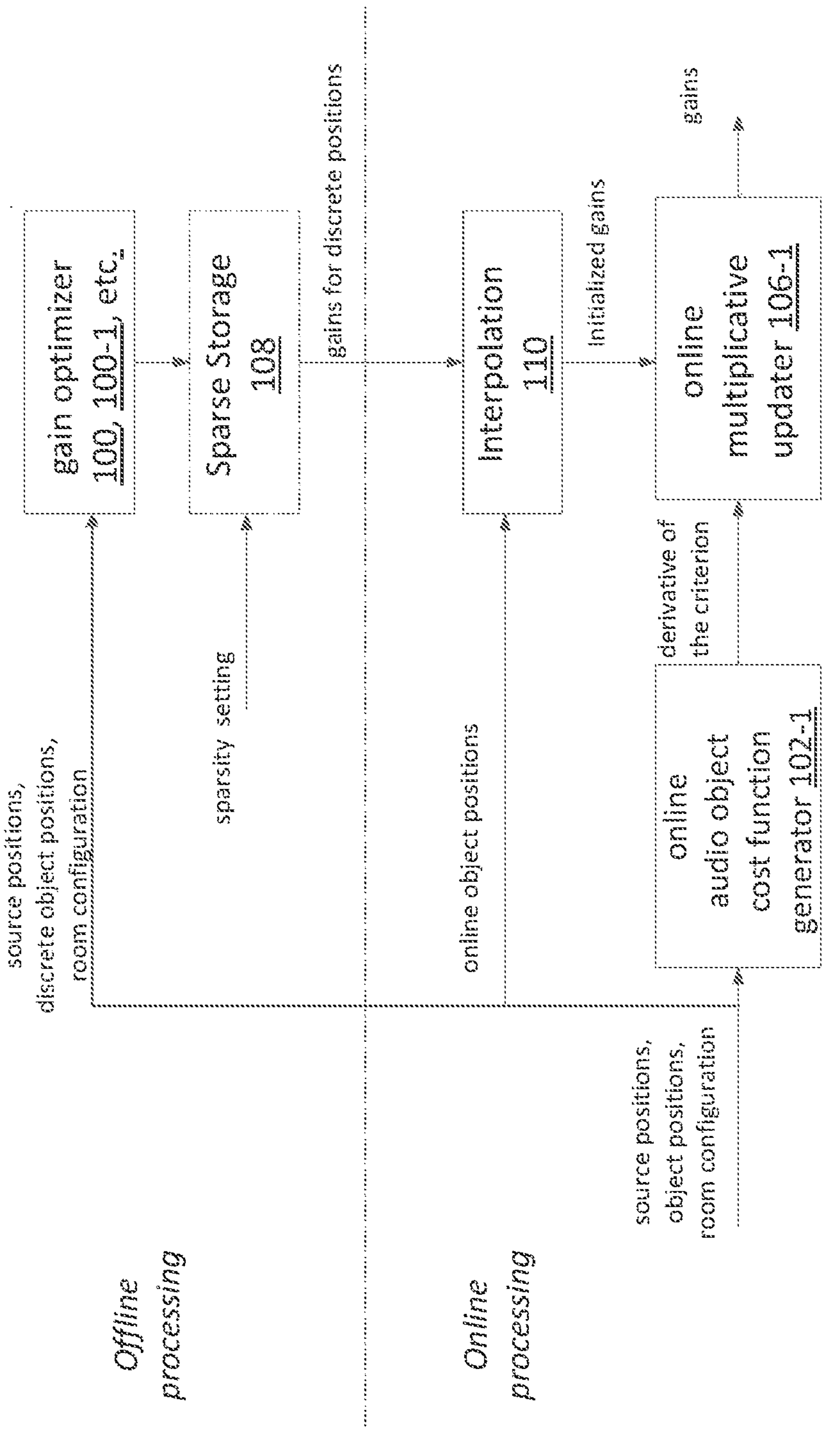
FIG. 7 illustrates an adaptive audio playback system in which gains are interpolated from precomputed gains and in which tradeoffs between memory and complexity can be adjusted with different sparseness settings for precomputed gain storage in accordance with example embodiments described herein.

FIG. 7 illustrates an adaptive audio playback system in which gains are interpolated from precomputed gains and in which tradeoffs between memory and complexity can be adjusted with different sparseness settings for precomputed gain storage. The adaptive audio playback system can select an optimal sparseness setting from among a plurality of different sparseness settings to adapt to a right balance between memory footprint and computational power. In some embodiments, the adaptive audio playback system comprises a gain optimizer (e.g., 100 of FIG. 1, 100-1 of FIG. 2, etc.), a sparse storage 108, an interpolation operator 110, an online audio object cost function generator 102-1 (which may be the same audio object cost function generator used in the gain optimizer), an online multiplicative updater 106-1 (which may be the same multiplicative updater used in the gain optimizer), etc.

In offline processing, the adaptive audio playback system can select or use a specific sparseness setting, from different sparseness settings, for a sparseness storage. The selection of the specific sparseness setting from the different sparseness settings can be based on one or more selection criteria including but not limited to, available memory space, computational power, an upper bound (e.g., 200 milliseconds, 50 milliseconds, 10 milliseconds, 5 milliseconds, 3 milliseconds, 1 millisecond or less, etc.) for online processing convergence time, and the like. The specific sparseness setting determines how the specific playback environment is populated by a plurality of (e.g., discrete) precomputed spatial positions.

The gain optimizer (e.g., 100 of FIG. 1, 100-1 of FIG. 2, etc.) generates or precomputes a plurality of sets of optimized values of gains for audio sources in a specific audio source layout in a specific playback environment in the offline processing in connection with the plurality of precomputed spatial positions. In some embodiments, the precomputation of the plurality of sets of optimized values of gains in the offline processing is only calculated once, given the specific audio source layout in the specific playback environment. Each set of optimized values of gains in the plurality of sets of optimized values of gains may correspond to a respective precomputed spatial position in the plurality of precomputed spatial positions. More specifically, a set of optimized values of gains (for the audio sources), which corresponds to a respective precomputed spatial position, is precomputed in the offline processing for the respective precomputed spatial position as if an audio object is located at the respective precomputed spatial position.

In some embodiments, the adaptive audio playback system stores the plurality of sets of gains precomputed in the offline processing at the plurality of precomputed spatial positions in the sparse storage (108), for example, in the form of a look-up table.

In online processing, the adaptive audio playback system is to use the audio sources in the specific playback environment to reproduce or render an actual audio object in the specific playback environment. To reduce computational complexity of the online processing, initial values of gains to reproduce or render the actual audio object at an actual spatial position may be obtained by the interpolation operator (110) through interpolation based on the optimized values of gains precomputed in the offline processing. More specifically, given the actual spatial position of the actual audio object in the online processing, an interpolation such as a trilinear interpolation, etc., can be applied by the interpolation operator (110), which uses optimized values of gains at the neighboring vertices. For example, one or more neighboring precomputed spatial positions that are closest to the actual spatial position of the actual object—of the lattices to derive initial values of gains (for the audio sources) for reproducing or rendering the actual audio object at the actual spatial position.

In some embodiments, the online audio object cost function generator (102-1) comprises software, hardware, a combination of software and hardware, and the like, configured to receive source configuration data for the specific playback environment, object configuration data for the actual audio object, which may be one of one or more audio objects that are to be (e.g., concurrently, serially, partly concurrently, partly serially, etc.) rendered by the audio sources.

In some embodiments, based on some or all of the source configuration data, the object configuration data and the room configuration, the online audio object cost function generator (102-1) generates a spatial representation of the audio sources and the actual audio object in the specific playback environment. The online audio object cost function generator (102-1) uses the spatial representation of the audio sources and the actual audio object in the specific playback environment to generate audio object cost functions (e.g., expression (5), etc.). For example, based on source spatial positions of the audio sources, an actual spatial position of the audio object, and the like, in the spatial representation, the online audio object cost function generator (102-1) generates an audio object cost function for the actual spatial position of the actual audio object.

In some embodiments, the online multiplicative updater (106-1) includes software, hardware, a combination of software and hardware, and the like, configured to iteratively generate or determine an update factor (e.g., expression (14) or expression (17)) from the audio object cost function that is generated by the online audio object cost function generator (102-1) for the actual spatial position (e.g., the initial spatial position) of the actual audio object. The multiplicative updater (106-1) uses the update factor to derive current values of the gains for the audio sources for the actual spatial position of the actual audio object from previous values of the gains for the audio sources for the same actual spatial position of the actual audio object, until converged (or optimized) values of the gains for the audio sources for the actual spatial position of the actual audio object are obtained. The multiplicative updater (106) then outputs the converged values (denoted as "gains" in FIG. 7) of the gains for the audio sources that can be used to drive the audio sources in the specific playback environment to represent or render the actual audio object located at the actual spatial position at a corresponding time point.

As illustrated in FIG. 6, if the specific sparseness setting corresponds to a relatively high number of precomputed spatial positions populated (or a higher lattice density) in the specific playback environment, dispersion—which is represented by a (e.g., spatial or non-spatial) difference between an actual spatial positon of an actual audio object to be reproduced or rendered in online processing and nearest precomputed spatial positions—gets smaller; accordingly, (e.g., linearly) interpolated gain values becomes more accurate. In some embodiments where the interpolated gain values are further refined or optimized (e.g., by a multiplicative update method, etc.) as illustrated in FIG. 7, this means a relatively few times of multiplicative iterations will be needed in the online processing to converge to accurate gain value (e.g., converged values of gains, optimized values of gains, etc.), thereby reducing the computational complexity in the online processing but at the cost of increasing memory usage.

Conversely, if the specific sparseness setting corresponds to a relatively small number of precomputed spatial positions populated (or a higher lattice density) in the specific playback environment, dispersion gets larger; accordingly, (e.g., linearly) interpolated gain values becomes less accurate. In the embodiments where the interpolated gain values are further refined or optimized (e.g., by a multiplicative update method, etc.) as illustrated in FIG. 7, this means a relatively large number of times of multiplicative iterations will be needed in the online processing to converge to accurate gain value (e.g., converged values of gains, optimized values of gains, etc.), thereby increasing the computational complexity in the online processing but at the benefit of decreasing memory usage.

8. Example Actual Audio Source Layouts

Figure 8:
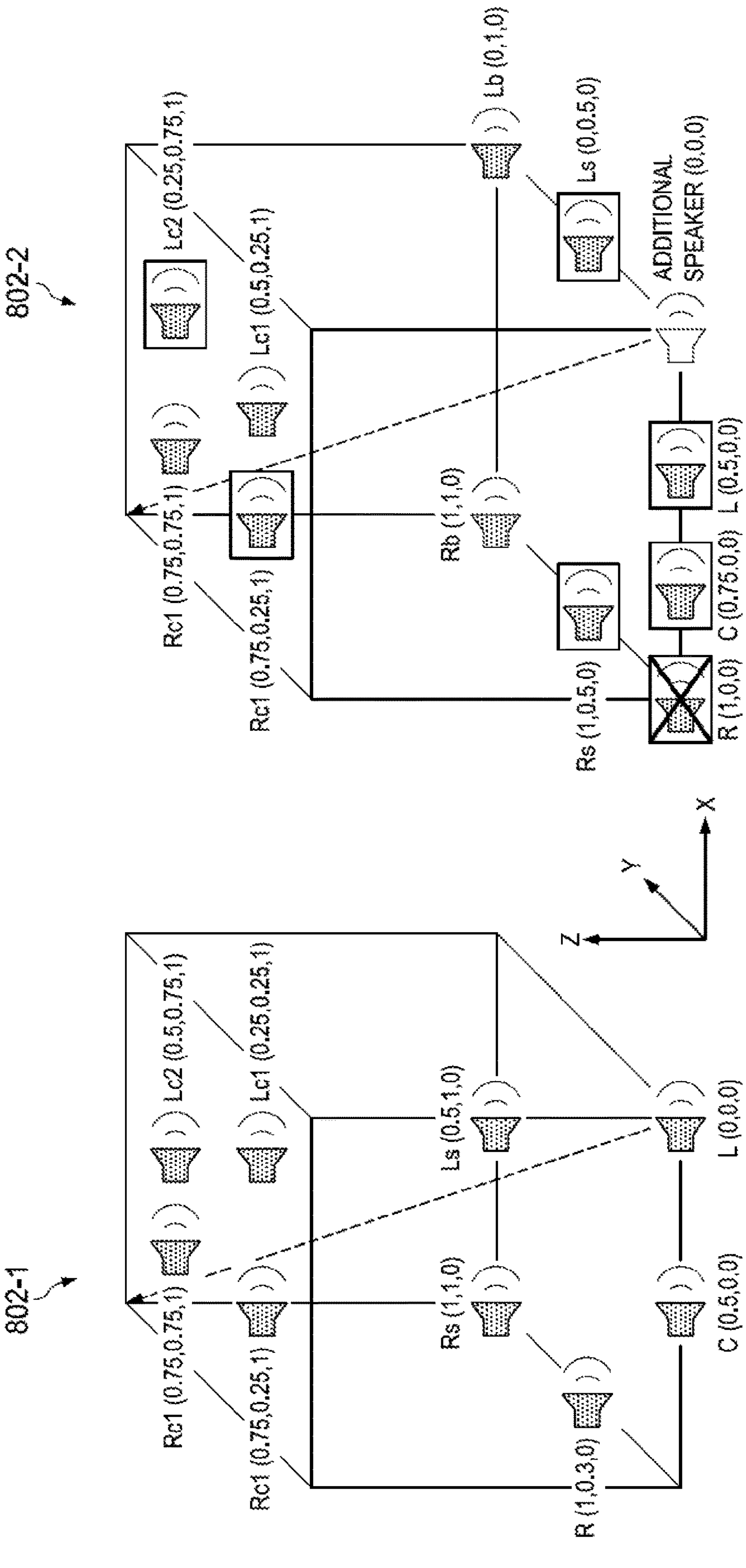
FIG. 8 illustrates an example audio object that traverses in similar diagonal spatial trajectories in two different playback environments in accordance with example embodiments described herein.

FIG. 8 illustrates an example audio object that traverses in two similar diagonal spatial trajectories in two different playback environments. These two different playback environments may be, but are not necessarily limited to only, two different rooms. The first room has a first audio source layout 802-1 that is an asymmetric 5.1.4 speaker setup. The second room has a second audio source layout 802-2 that is an asymmetric 7.1.4 speaker setup FIG. 8. The audio object may be panned with the two similar diagonal trajectories across the two rooms. Techniques as described herein can be implemented to reproduce or render the audio object (possibly along with other audio objects) in any of a wide variety of audio source layouts in a myriad of playback environments including but not limited to those illustrated in FIG. 8. Additionally, optionally, or alternatively, these techniques can be implemented to operate with audio source layouts that are irregular. For example, both the audio source layouts 802-1 and 802-2 can be irregular (e.g., irregular 5.1.4 speaker setup, irregular 7.1.4 speaker setup, etc.). Source spatial positions, or spatial positions of audio speakers, may be at standard-locations, non-standard locations, and the like. Some examples of audio object panning and audio source gain calculation are described in PCT Application No. WO 2015/017037 A1, the contents of which are hereby incorporated by reference in its entirety.

Many operational scenarios may involve some irregular surround set-ups in which all audio speakers are in small or irregular regions of spatial volumes of playback environments. Since the center of (speaker) loudness is inside the convex hull of the audio speakers, it may not be possible to obtain a center of speaker loudness to match an audio object in out-of-hull regions, unless negative gains are used. While it is possible to obtain final nonnegative gains by post-processing of gains such as zeroing negative gains at the end of optimization, the result represented by the nonnegative gains after zeroing negative gains is an incomplete solution to optimization and does not represent an optimized solution for the given speaker set-up; these final nonnegative gains are no longer optimized values of gains.

Techniques as described herein can be implement to support out-of-hull optimization of gain values. The out-of-hull optimization refers to a determination of optimized values of gains for audio sources (e.g., in an adaptive source layout, etc.) to reproduce or render an audio object that is located out of the convex hull formed by the audio sources.

In some embodiments, a playback environment may include a plurality of audio sources (or audio speakers). Each audio speaker in the plurality of audio speakers is located in a respective spatial position in a plurality of (e.g., discrete) source spatial positions in the playback environment.

Under adaptive source layout techniques as described herein, an adaptive audio playback system may activate a first subset of selected audio sources in the plurality of audio sources for reproducing or rendering an audio object at a first spatial position of a spatial trajectory of the audio object. The adaptive audio playback system may activate a second subset of selected audio sources in the plurality of audio sources for reproducing or rendering the audio object at a second spatial position of the spatial trajectory of the audio object. The first subset of selected audio sources and the second subset of selected audio sources may or may not have an identical composition of audio sources in the specific playback environment.

Similarly, under the adaptive source layout techniques as described herein, an adaptive audio playback system may activate a first subset of selected audio sources in the plurality of audio sources for reproducing or rendering a first audio object at a first spatial position of a first spatial trajectory of the first audio object. The adaptive audio playback system may activate a second subset of selected audio sources in the plurality of audio sources for reproducing or rendering a second audio object at a second spatial position of a second spatial trajectory of the second audio object. The first subset of selected audio sources and the second subset of selected audio sources may or may not have an identical composition of audio sources in the specific playback environment. Additionally, optionally, or alternatively, the first and second audio objects may be (e.g., in entirety, in part, etc.) concurrently rendered by the first subset of selected audio sources and the second subset of selected audio sources in the specific playback environment.

In some embodiments, some media applications (e.g., audio applications, audiovisual applications, etc.) may need activating fewer audio sources (e.g., firing fewer audio speakers) than what available in a given audio source layout in a specific playback environment. The activation of fewer than available audio sources can be used to reduce potentials or probabilities of spatial combing due to excessive phantom imaging, to comply with specific regularizations in spatial coding, to meet artistic intent such as zone-masking, etc.

Using the adaptive source layout techniques as described herein, an adaptive audio playback system may activate a first subset of selected audio sources in the plurality of audio sources in a first media application. The adaptive audio playback system may activate a second subset of selected audio sources in the plurality of audio sources in a second different media application. The first subset of selected audio sources and the second subset of selected audio sources may or may not have an identical composition of audio sources.

Additionally, optionally, or alternatively, an adaptive audio playback system may activate a first subset of selected audio sources in the plurality of audio sources for creating a first audio effect in compliance with artistic intent. The adaptive audio playback system may activate a second subset of selected audio sources in the plurality of audio sources in a second different audio effect in compliance with artistic intent. The first subset of selected audio sources and the second subset of selected audio sources may or may not have an identical composition of audio sources in the specific playback environment.

From an implementation point of view, relatively high computational cost may be associated with a high number of non-zero gains due to audio mixing operations in connection with a high number of audio sources that correspond to the high number of the non-zero gains. An adaptive audio playback system as described herein can tune or select a rendering method to fire "fewer speakers" than what available in a specific playback environment without sacrificing spatial quality. The adaptive audio playback system can apply different criteria to select or force only a subset of audio sources in a plurality of audio sources in a given audio source layout in a specific playback environment to be activated (or fired). Examples of criteria for selecting fewer than available audio sources may include but are not necessarily limited to only, any, some, or all of: distances of audio sources (e.g., relative to an audio object to be reproduced or rendered, etc.), gain rankings (e.g., ranks in initial gain values obtained using a gain computation method that may generate positive and/or negative gain values, etc.), media applications, audio effect types, audio source control information (e.g., as received in audio metadata, etc.), or some other metrics used to differentiate among audio sources/objects/applications/effects.

By way of example but not limitation, in some embodiments, a first gain optimization method (e.g., the inverse-matrix method, a (quadratic programming) QP-based solution that does not enforce nonnegativity gain constraint, a gradient descent method, etc.) that may generate nonnegative as well as negative gain values may be combined with a second gain optimization method (e.g., the multiplicative-update method, a QP-based solution that enforces nonnegativity or positivity gain constraint, an interior point optimizer, a gradient descent method that enforces nonnegativity or positivity gain constraint, etc.) that maintains positivity of updated gain values into an efficient and optimized method for firing fewer audio sources. More specifically, gain values derived by the first gain optimization method may be used as (e.g., optimized) initial gain values. Furthermore, based on the initial gain values obtained with the first gain optimization method, those audio sources with negative initial gain values may (e.g., automatically) become unselected simply by setting each of those negative initial gain values to a special value such as zero or a negligible small gain value (e.g., 0.001, 0.0001, a gain value below a near-zero positive gain value limit, etc.) indicating that audio sources associated with those negative initial gain values are excluded from optimization, before the second gain optimization method is applied to obtain optimized gain values that are nonnegative (e.g., positive, above a positive gain value threshold, etc.). Those audio sources that have not been excluded based on the initial gain values obtained by the first gain optimization method may (e.g., automatically) become selected (or activated) for the optimization of gain values based on the second gain optimization method.

In some embodiments, only audio sources with negative initial gain values are excluded from being optimized in the second gain optimization method and become unselected. In some embodiments, only audio sources with negative and zero initial gain values are excluded from being optimized in the second gain optimization method and become unselected. In some embodiments, only audio sources with initial gain values below a gain value threshold (which may be a positive gain value) are excluded from being optimized in the second gain optimization method and become unselected. Thus, in some embodiments, an audio source with a small positive gain value below an applicable gain value threshold may have its gain value to be reset to zero or a negligible small gain value (e.g., 0.001, 0.0001, a gain value below a near-zero positive gain value limit, etc.) by a gain optimizer as described herein (which may mean that the audio source is relatively far from the audio object to be rendered).

Figure 9:
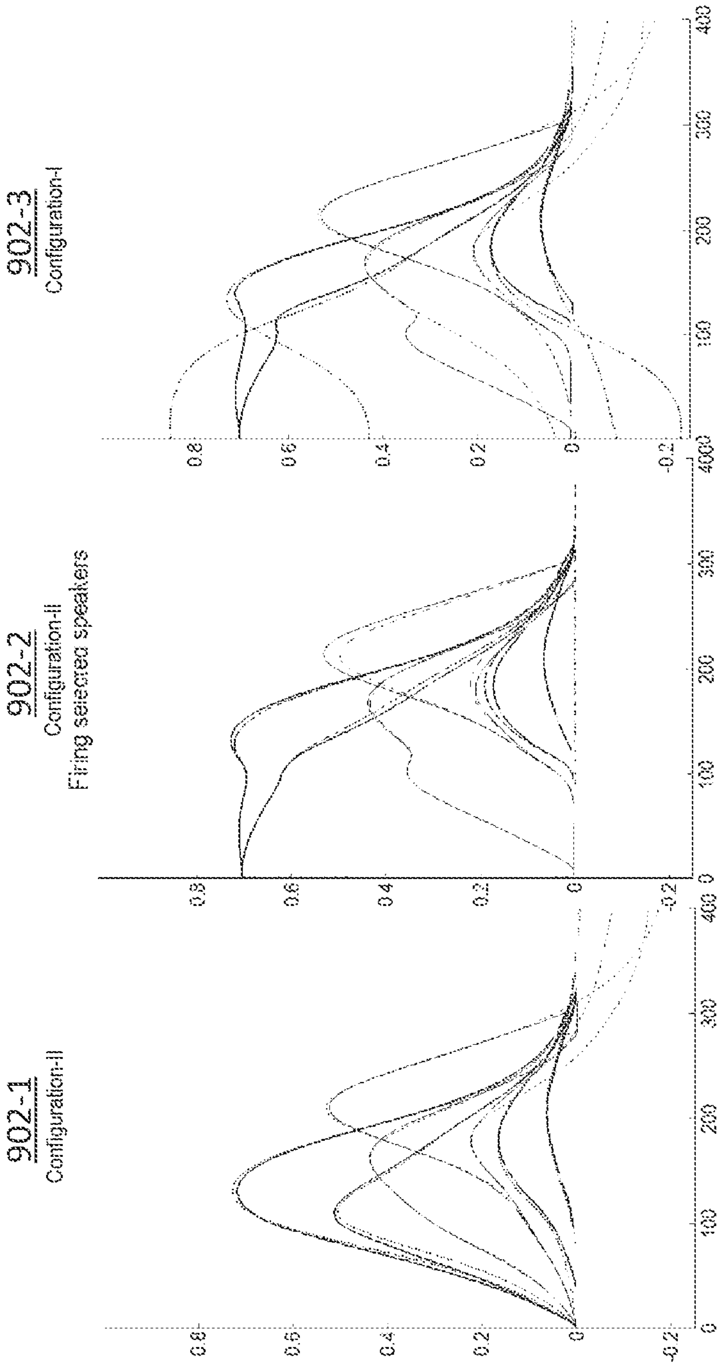
FIG. 9 illustrates example panning curves for an audio object with a diagonal trajectory across a room in accordance with example embodiments described herein.

FIG. 9 illustrates example panning curves 902-1 through 902-3 for an audio object with a diagonal trajectory across the room with an example irregular 7.1.4 speaker setup (e.g., the audio source layout 802-2 of FIG. 8, etc.) and with an example alternative speaker setup that includes the irregular 7.1.4 speaker setup and one additional audio source located at a source spatial position of (0, 0, 0). These panning curves are plots of gain values of audio sources in the vertical axis against audio frame indexes in the horizontal axis, where the audio frame indexes in the horizontal axis can be mapped to corresponding object spatial positions of an audio object to be rendered by the audio sources with gain values of the panning curves.

By way of example but not limitation, the irregular 7.1.4 speaker setup (in the present example, the audio source layout 802-2 of FIG. 8), which is denoted as Configuration-II in FIG. 9, includes the following speakers: Left at (0.5, 0, 0), Right at (1, 0, 0), Center at (0.75, 0, 0), Left side at (0, 0.5, 0), Right side at (1, 0.5, 0), Left back at (0, 1, 0), Right back at (1, 1, 0), Top left front at (0.5, 0.25, 1), Top right front at (0.75, 0.25, 1), Top left back at (0.25, 0.75, 1), and Top right back at (0.75, 0.75, 1). The alternative audio source layout, which is denoted as Configuration-I in FIG. 9, includes the above-mentioned speakers and the additional speaker at (0, 0, 0).

Panning curves (902-1) are generated for all audio sources (or audio speakers) in Configuration-II under the inverse-matrix method. Panning curves (902-2) are generated for selected audio sources (or selected audio speakers) in Configuration-II under a combination of the inverse-matrix method and the multiplicative-update method. Panning curves (902-3) are generated for all audio sources (or audio speakers) in Configuration-I under the inverse-matrix method.

In some embodiments, in Configuration-II, for the purpose of reproducing or rendering the audio object with the diagonal trajectory, only audio sources (or "activatable speakers") that can deliver nonnegative initial gain values (e.g., based on initial gain values as determined under the inverse-matrix method, etc.) will be engaged or selected in the optimization of gain values, whilst the other speakers (or "unactivatable speakers") will be automatically excluded from the optimization of gain values. Panning curves (902-2 of FIG. 9) representing gain values used to reproduce or render the audio object with the diagonal spatial trajectory can be generated for the selected audio sources in the audio source layout (802-2).

In some embodiments, according to the spatial trajectory of the audio object and spatial positions of audio sources (or source spatial positions) in the audio source layout (802-2 of FIG. 8), once an audio source turns from being "unactivatable" (corresponding to a negative initial gain value) into being "activatable" (corresponding to a non-negative initial gain value) as the audio object traverses through the spatial trajectory, the audio source will be automatically engaged in the optimization of gain values. Different sets of selected audio sources may be used to reproduce or render the audio object in different spatial positions of the spatial trajectory of the audio object.

For example, a set of panning curves with solid lines in 902-2 of FIG. 9 comprises panning curves for a first set of selected audio sources to reproduce or render the audio object in a first portion of the diagonal trajectory of the audio object, whereas another set of panning curves with "-.-" lines in 902-2 of FIG. 9 includes panning curves for a second set of selected audio sources to reproduce or render the audio object in a second portion of the diagonal trajectory of the audio object. As a result, smooth and stable panning gain values can be obtained no matter whether the audio object is in/out/traversing a border of a convex hull formed by all the audio sources and/or by one or more sets of selected audio sources.

Techniques as described herein and other approaches give different optimization results with different topologies (or different topological changes) of audio source layouts. For example, in Configuration-II, the audio object is outside the convex hull of the audio sources for the first 100 frames, whereas in Configuration-I (which has the additional speaker at (0, 0, 0)), the audio object is inside the convex hull of the audio sources for the first 100 frames. As can be seen from FIG. 9, panning curves (902-1) for Configuration-II vary remarkably from panning curves (902-3) for Configuration-I, even though both sets of panning curves are generated under the inverse-matrix method, with a relatively small topological change of adding the additional speaker at position (0, 0, 0). More specifically, in panning curves (902-3), around the first 100 frames, the audio object is outside the hull in Configuration-I, so the inverse-matrix method produces negative gains for the center, right side, left back, right, right back, top right back speakers. Further, gain values are not an optimized solution for the remaining speakers with positive gains under the inverse-matrix method. As shown in FIG. 9, while it is expected that optimized gain values for the left and the left side speakers ought to be identical or similar as these two speakers are symmetric and closest to the audio object in the be trajectory in the beginning of the spatial trajectory of the audio object, panning curves for these two speakers under the inverse-matrix method show a large difference (e.g., in terms of gain values).

In contrast, under techniques as described herein, initialization is performed with a gain optimization method that generates nonnegative as well as negative optimized gain values for activating/deactivating audio sources, and further optimization of selected audio sources is performed with a second gain optimization method that maintains nonnegativity of updated gain values. The approach under these techniques manages to produce globally optimized gains and avoid spatial distortion during rendering as shown in panning curves (902-2) of FIG. 9.

By comparing panning curves (902-2) and panning curves (902-3), it can be seen that panning curves (902-2) are relatively consistent with panning curves (902-3) that represent optimization by the inverse-matrix method after Configuration-II is changed to Configuration-I by placing the additional audio speaker at (0, 0, 0). In other words, the optimization results, or the panning curves, for Configuration-II with the selected audio sources under the techniques as described herein are consistent with the optimization results, or the panning curves, for Configuration-I with the additional audio source added at the source spatial position (0, 0, 0).

In addition, when continuing disabling more speakers or selecting fewer speakers, the optimization result under the techniques as described herein changes in a consistent way. For example, when the right speaker at (1, 0, 0) in the audio source layout (802-1) of FIG. 8 is further disabled, the optimization result or the panning curves are plotted with "-.-" lines among penning curves (902-2) of FIG. 9. Some gain values for some speakers after the right speaker at (1, 0, 0) is disabled are slightly boosted and some other gain values for some other speakers are slightly reduced. These modifications in gain values for compensating the disabled right speaker comply with the center of loudness constraint as represented by the first term ($E_{CL}$) in expression (1).

9. Adaptive Audio Source Layout

Figure 10:
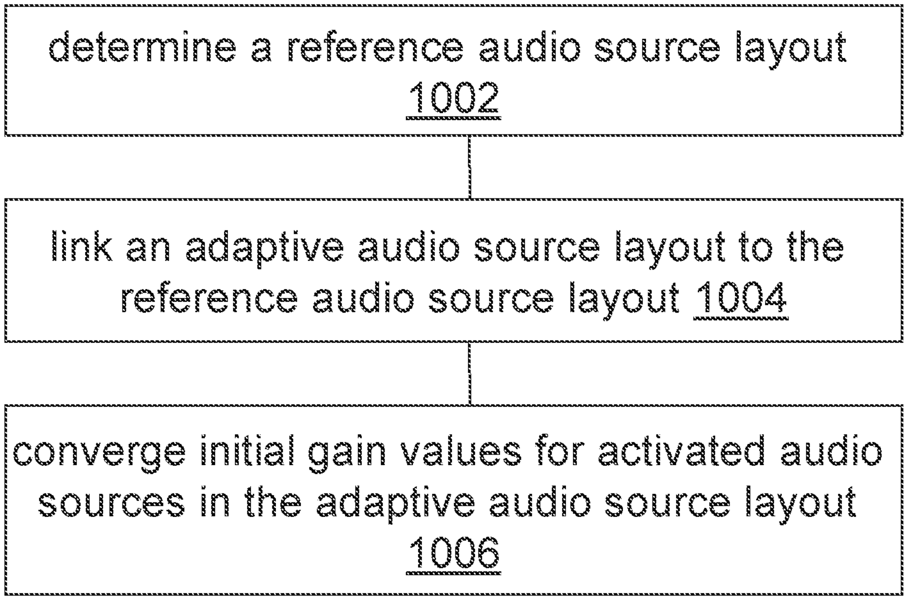
FIG. 10 illustrates an example adaptive audio source layout method for out-of-hull optimization in accordance with example embodiments described herein.

FIG. 10 illustrates an example adaptive audio source layout method for out-of-hull optimization. In some embodiments, the optimization may be performed with an adaptive audio playback system implementing adaptive audio source layout techniques that activate (or fire) fewer than available audio sources in a reference audio source layout.

In block 1002, the adaptive audio playback system determines a reference audio source layout available in a specific playback environment. The adaptive audio playback system uses the reference audio source layout for initializing gain values and/or for performing offline processing to generate precomputed gain values for precomputed (object) spatial locations in the specific playback environment.

The reference audio source layout may or may not represent an actual audio source layout in the specific playback environment. In some embodiments, the reference audio source layout may represent a superset of one or more (e.g., defined, standard, proprietary, etc.) audio source layouts each of which may be used in some specific or general audio playing applications (e.g., cinema, home theater, living room, auditorium, bar, restaurant, amusement park, etc.). By way of example but not limitation, in some embodiments, the reference audio source layout may represent a 7.1.4 speaker layout, which may represent a superset of a 7.1.2 speaker layout, a 7.1 speaker layout, a 5.1.4 speaker layout, a 5.1.2 speaker layout, a 5.1 speaker layout, a stereo speaker layout, etc., each of which may be applicable to a respective set of specific or general media applications (e.g., audio playing applications, etc.).

In some example embodiments, the reference audio source layout may represent a 22.2 speaker layout, which may be a superset or pseudo-superset of other speaker layouts. As used herein, a pseudo-superset may, but is not limited to only, refer to a virtual speaker layout that is not necessarily defined in standards or in proprietary specifications. In some example embodiments, a pseudo-superset may be formed by audio sources in a standard or proprietary defined audio source layout plus or minus certain audio sources, for example, in scenarios that the standard or proprietary defined audio source layout does not include audio source located at certain specific (e.g., irregular, etc.) locations of a specific audio source layout in a specific playback environment. In some embodiments, lattice points may be populated in the specific playback environment as source spatial positions for audio sources included in a pseudo-superset.

In block 1004, for one or more spatial positions of an audio object, the adaptive audio playback system links an adaptive audio source layout to the reference audio source layout by identifying which audio sources in the reference audio source are to be deactivated from being used as selected audio sources to reproduce or render the audio object at the one or more spatial positions. This may be done with a first gain optimization method that generates non-negative and/or negative gain values as initial gain values for audio sources in the reference audio source layout, as if all the audio sources in the reference audio source layout are to be used to reproduce or render the audio object at the one or more spatial positions.

In an example embodiment, the first gain optimization method that generates the nonnegative and/or negative initial gain values may be, but is not limited to only, the inverse-matrix method as represented in expression (12).

In some embodiments, audio sources that have negative (optimized) initial gain values as derived from the first gain optimization method are deactivated from being used to reproduce or render the audio object at the one or more spatial positions. In some embodiments, audio sources that have negative and zero initial gain values are deactivated from being used to reproduce or render the audio object at the one or more spatial positions. In some embodiments, audio sources that have initial gain values below a gain value threshold are deactivated from being used to reproduce or render the audio object at the one or more spatial positions.

The deactivated audio sources in the reference audio source layout are excluded from further optimization for reproducing or rendering the audio object at the one or more spatial positions. These deactivated audio sources could be used to reproduce or render the audio object in one or more other spatial positions. These deactivated audio sources could also be used to reproduce or render one or more different audio objects.

In block 1006, for the one or more spatial positions of the audio object, the adaptive audio playback system applies a second gain optimization method such as the multiplicative-update method that maintains nonnegativity (e.g., positivity, etc.) of gain values to converge the initial gain values for activated audio sources in the adaptive audio source layout (or audio sources in the reference audio source layout that have not been deactivated in block 1004) into optimized gain values to reproduce or render the audio object at the one or more spatial positions by the activated audio sources (which represents a set audio sources that form an adaptive source layout).

In some embodiments, additional processing such as interpolation, etc., can be performed in conjunction with some or all of the operations as described herein. In an example, in connection with or as a part of operations in block 1004, interpolation between source spatial positions of audio sources defined in the reference audio source layout and source spatial positions of actual audio sources in the actual audio source layout may be performed to adapt (optimized) initial gain values obtained with the reference audio source layout into initial gain values for the audio sources of the actual audio source layout in the specific playback environment. The interpolated initial gain values may be used deactivate audio sources in the actual audio source layout that have disqualifying initial gain values (e.g., negative interpolated initial gain values, etc.). The remaining audio sources in the actual audio source layout with interpolated initial gain values may be used for further optimization.

In another example embodiment, in connection with or as a part of operations in block 1006, interpolation between source spatial positions of activated (e.g., with positive gain) audio sources defined in the reference audio source layout and source spatial positions of actual audio sources in the actual audio source layout may be performed to adapt optimized gain values obtained with the activated audio sources of the reference audio source layout into approximate gain values for the audio sources of an actual audio source layout in the specific playback environment. Further optimization, for example using the second gain optimization method as mentioned above, may be performed on the approximate gain values (or interpolated gain values) to generate final optimized gain values for the audio sources of the actual source layout in the specific audio playback to reproduce or render the audio object at the one or more spatial positions.

Under other approaches that do not implement the techniques as described herein, an optimization method may need to be re-implemented or specifically ported (with device specific functionality that is tied to specific system configuration) many times on different platforms, and may need to involve complicated and customized distributed processing across multiple processors. As a result, the optimizations implemented under the other approaches often have to run in stringent, specialized system configurations and cannot be efficiently applied or adapted to a wide variety of playback environments, audio source layouts, systems, applications, etc.

By way of comparison, a number of benefits can be obtained under techniques as described herein. For example, an iterative gain optimization method such as nonnegative multiplicative updates can be implemented in a wide variety of playback environments, audio source layouts, systems, applications, etc. The iterative gain optimization method may be implemented with fewer or no tunable parameters or ad hoc heuristics to ensure convergence. In addition, the iterative gain optimization method can be implemented to provide a guarantee of monotonic convergence, as the updates of the iterative gain optimization can be implemented to decrease the numeric value (representing the cost) of the audio object cost function at each iteration.

Techniques as described herein can also be used to eliminate undesirable features of generating negative gains and sub-optimal approximations ab initio before actual optimization of activated audio sources in a specific playback environment rather than simply zeroing negative gains at the end of optimization as in other approaches. The techniques as described herein are also computationally efficient and can be implemented in an audio playback system that has relatively stringent computational resources.

Many computing processors such as fixed-point processors are to some extent inefficient at "division-shaped" problems such as those performed in the inverse-matrix method. In addition, division-shaped problems may create scalability issues. Matrix inversion operations may involve re-estimating all multiple elements in a gain vector in parallel, as opposed to simply performing coordinate descent under an iterative method. For vectors or matrixes of large dimensionality, the matrix inversion operations may be prohibitively expensive in terms of CPU costs and memory usages.

In contrast, under the techniques as described herein, most if not all gain computation can be performed in an iterative method that involves few or no computing divisions. Iterative multiplicative operations can be performed relatively efficiently with a variety of type of computing processors including but not necessarily limited to only fixed-point processors.

Techniques as described herein further allow flexibilities in several aspects. Tradeoffs can be made between memory space and computational complexity. Gain computation as described herein can operate with a relatively small memory space and a relatively large number of computations. Gain computation can also operate with a relatively large memory space and a relatively small number of computations. Distributions of precomputed spatial positions in a playback environment for generating precomputed gain values can be controlled flexibly by sparseness settings. In addition, optimization of gain values can be generated with adaptive source layouts adapted from a reference audio source layout that may or may not be an actual audio source layout in a specific playback environment, a superset or pseudo-superset that may or may not be based on standards or proprietary specifications, etc.

In some example embodiments, initial gain values may be individually determined for each spatial position in a plurality of spatial positions that represent a spatial trajectory of an audio object, for example, using a gain optimization method (e.g., one that generates nonnegative and/or negative gain values, etc.) for reproducing or rendering the audio object at that spatial position.

More specifically, initial gain values may be determined for a first spatial position of one or more spatial positions in a plurality of spatial positions that represent a spatial trajectory of an audio object, for example, using a gain optimization method (e.g., one that generates nonnegative and/or negative gain values, etc.) for reproducing or rendering the audio object at the one or more spatial positions. Initial gain values for another spatial position of the one or more spatial positions may use optimized gain values of a spatial position (e.g., the first spatial position) that is spatially or time-wise before the other spatial position. This may be used to ensure the same set of audio sources is (e.g., stably, smoothly, continuously, etc.) activated for all of the one or more spatial positions in these embodiments.

As described herein, a spatial position of an audio object may be associated with, or correspond to, one or more audio frames or a subdivision (e.g., one or more audio data blocks, one or more audio samples, etc.) of a single audio frame. In an example, a set of activated audio sources used to reproduce or render an audio object at a spatial position may mean that the set of activated audio sources are used to reproduce or render the audio object represented in one or more specific audio frames. In another example, a set of activated audio sources used to reproduce or render an audio object at a spatial position may mean that the set of activated audio sources are used to reproduce or render the audio object represented in one or more specific audio data blocks of a specific audio frame. In yet another example, a set of activated audio sources used to reproduce or render an audio object at a spatial position may mean that the set of activated audio sources are used to reproduce or render the audio object represented in one or more audio samples in a specific audio data block of a specific audio frame. Embodiments may include these and other variations of what portion of audio content a spatial position of an audio object may correspond to.

In some application scenarios such as those related to AVRs, both memory and computation resources could be severely limited. An adaptive audio playback system may be implemented with a system configuration such as illustrated in FIG. 7, which can be implemented with relatively modest or low memory and computation resources. For example, a sparseness setting for sparse storage of such a system configuration can be set as low as for 5×5×5 lattice points, while the upper limit of iteration times as few as 50 can be met with the system configuration.

It may be noted that in expression (4) the value of $\alpha_{sum\text{-}to\text{-}one}$, relative to the range of values of spatial positions of an audio object and source spatial positions (or spatial positions of audio sources), could have a relatively significant effect on the speed of convergence.

Assuming that the objective constraint $\Sigma_i g_i=1$ is satisfied, from expressions (6) through (12) it can be seen that if $\alpha_{sum\text{-}to\text{-}one}$ is numerically large, such that it dominates the other terms in (6), then $[\nabla E(g)]\_\approx[\nabla E(g)]\approx 2\alpha_{sum\text{-}to\text{-}one}$. As a result, the update rule in expression (17) becomes approximately as follows:

$$g \leftarrow g. \tag{20}$$

In other words, convergence would require potentially infinitely many iterations. Thus, to achieve fast convergence, $\alpha_{sum\text{-}to\text{-}one}$ may be kept to a small value, relative to the magnitude of the other terms in (6). In some embodiments, a value of $\alpha_{sum\text{-}to\text{-}one}=0.01$ or some other small values (e.g., 0.02, etc.) may be used.

In some discussion herein, an audio object has been described to be located at a specific spatial position. This is for the purpose of illustration only. In various embodiments, an audio object as described herein may or may not have a single spatial position at any given time. For example, an audio object may not be a single point, but rather may be of a non-zero spatial size (e.g., a volume or planar size, etc.) that corresponds to more than one spatial location. In some embodiments, a spatial location of an audio object may represent a center of loudness, a point of symmetry, and the like, of the audio object that may be of a non-zero spatial size. In some embodiments, an audio object that is of a non-zero spatial size may be represented spatially as an integration of many small component audio objects that are approximated as spatial points with zero or infinitesimally small spatial sizes.

10. Example Process Flow

Figure 11:
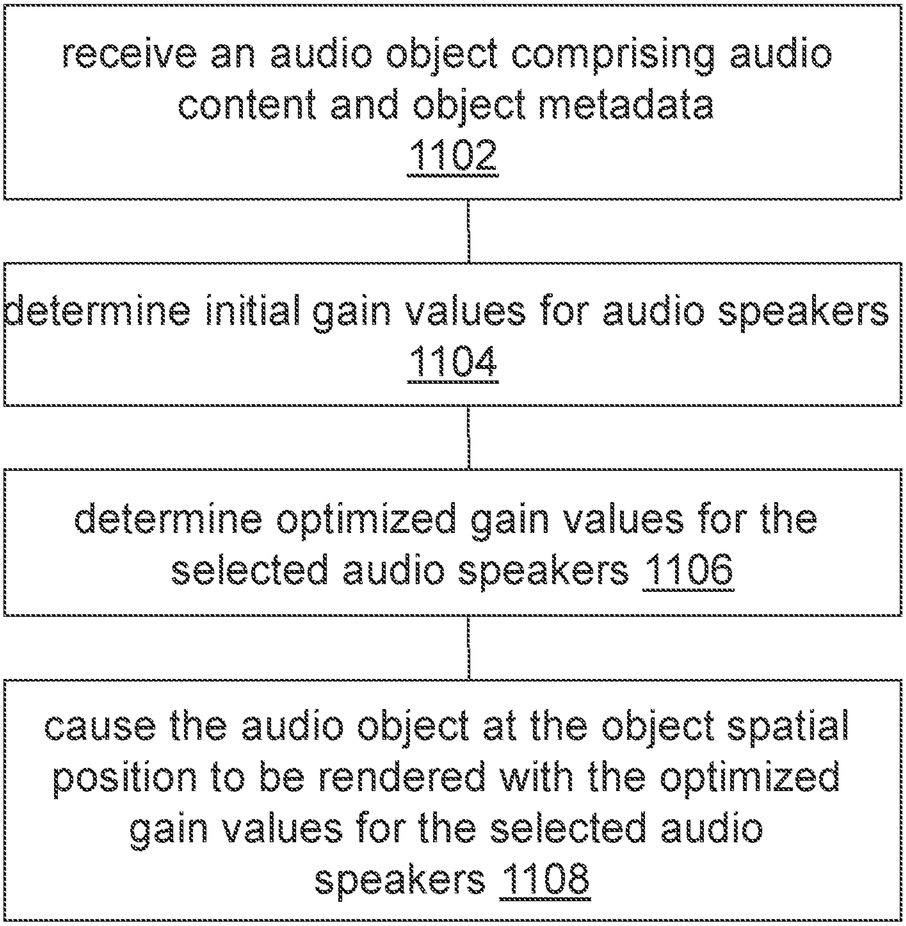
FIG. 11 illustrates an example process flow in accordance with example embodiments described herein.

FIG. 11 illustrates an example process flow suitable for describing the example embodiments described herein. In some embodiments, one or more computing devices or units (e.g., an audio playback system as described herein, etc.) may perform the process flow.

In block 1102, the audio playback system receives an audio object comprising audio content and object metadata, the object metadata of the audio object indicating an object spatial position of the audio object to be rendered by a plurality of audio speakers in a playback environment, each audio speaker in the plurality of audio speakers being located in a respective source spatial position in a plurality of source spatial positions in the playback environment.

In block 1104, the audio playback system determines, based on the object spatial position of the audio object and the plurality of source spatial positions of the plurality of audio speakers, a plurality of initial gain values for the plurality of audio speakers, each audio speaker in the plurality of audio speakers being assigned with a respective initial gain value in the plurality of initial gain values.

In block 1106, the audio playback system determines, based on the object spatial position of the audio object and a set of source spatial positions at which the set of audio speakers are respectively located in the playback environment, a set of optimized gain values for the set of audio speakers.

In block 1108, the audio playback system causes the audio object at the object spatial position to be rendered with the set of optimized gain values for the set of audio speakers, each audio speaker in the set of audio speakers being assigned with a respective optimized gain value in the plurality of optimized gain values.

In an embodiment, the audio playback system uses one or more negative initial gain values among the plurality of initial gain values to deactivate one or more corresponding audio sources, in the plurality of audio sources in the playback environment, from taking part in rendering the audio object located at the object spatial position.

In an embodiment, the audio playback system uses one or more zero and negative initial gain values among the plurality of initial gain values to deactivate one or more corresponding audio sources, in the plurality of audio sources in the playback environment, from taking part in rendering the audio object located at the object spatial position.

In an embodiment, the audio playback system uses one or more initial gain values below a gain value threshold among the plurality of initial gain values to deactivate one or more corresponding audio sources, in the plurality of audio sources in the playback environment, from taking part in rendering the audio object located at the object spatial position.

In an embodiment, the plurality of initial gain values is generated by a first gain optimizer that generates nonnegative optimized gain values and negative optimized gain values; the set of initial gain values is generated by a second different gain optimizer that maintains nonnegativity of nonnegative optimized gain values.

In an example embodiment, the first gain optimizer represents one of an inverse-matrix gain optimizer, a gain optimizer that does not preclude negative gain values, and the like.

In an example embodiment, the second gain optimizer represents one of a multiplicative-update gain optimizer, an interior point optimizer, a quadratic-programming gain optimizer, a gradient descent gain optimizer, a gain optimizer that maintains nonnegativity of nonnegative optimized gain values, and the like.

In an embodiment, the object spatial position represents a spatial position in a spatial trajectory of the audio object.

In an embodiment, the object spatial position is related to audio content in one of one or more audio frames, one or more subdivision of an audio frame, etc.

In an embodiment, the plurality of initial gain values for the plurality of audio speakers are at least in part derived through interpolating precomputed optimized gain values for the plurality of audio speakers in the playback environment.

In an embodiment, the precomputed optimized gain values are a part of a plurality of sets of precomputed optimized gain values for a plurality of precomputed object spatial positions in the playback environment. In an embodiment, the plurality of precomputed object spatial positions in the playback environment is determined based on a specific sparseness setting.

In an embodiment, the precomputed optimized gain values are precomputed and stored in a lookup table in offline processing.

In an embodiment, the audio playback system performs: while in offline processing: selecting, based on one or more selection criteria, a specific sparseness setting from among a plurality of selectable sparseness settings, the specific sparseness setting determining a plurality of precomputed spatial positions in the playback environment; generating a plurality of sets of precomputed optimized gain values for the plurality of precomputed spatial positions, each set of precomputed optimized gain values in the plurality of sets of precomputed optimized gain values corresponding to a respective precomputed spatial position in the plurality of precomputed spatial positions; while in online processing: deriving the plurality of initial gain values for the plurality of audio speakers at least in part from interpolated gain values from the plurality of sets of precomputed optimized gain values.

In an embodiment, the audio playback system, while in the online processing: performs optimization of the interpolated gain values to determine the plurality of initial gain values for the plurality of audio speakers.

In an embodiment, the plurality of initial gain values for the plurality of audio speakers are directly set to the interpolated gain values in the online processing.

Embodiments include a media processing system configured to perform any one of the methods as described herein.

Embodiments include an apparatus including a processor and configured to perform any one of the foregoing methods.

Embodiments include a non-transitory computer readable storage medium, storing software instructions, which when executed by one or more processors cause performance of any one of the foregoing methods. Note that, although separate embodiments are discussed herein, any combination of embodiments and/or partial embodiments discussed herein may be combined to form further embodiments.

11. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 12:
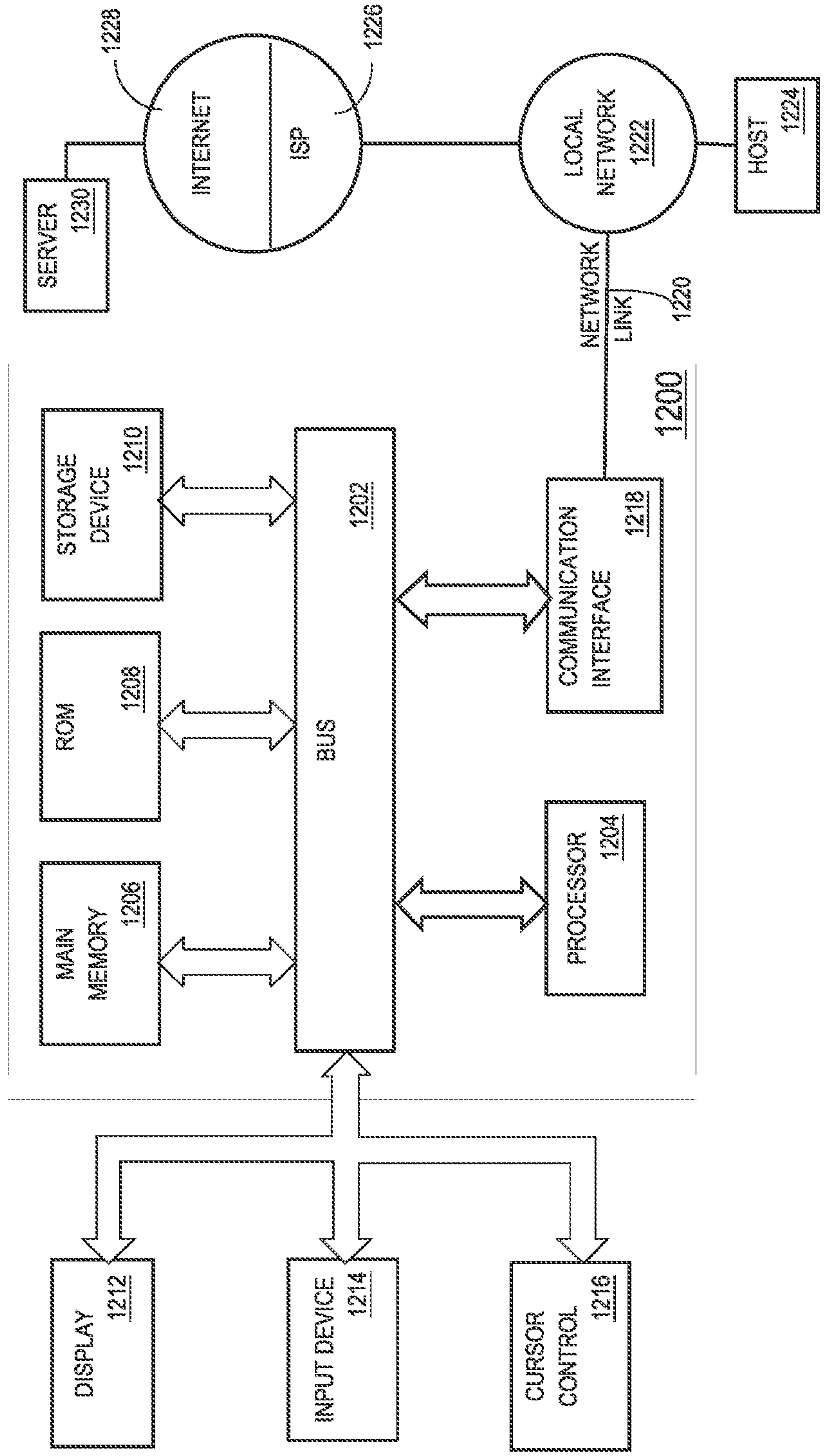
FIG. 12 illustrates an example hardware platform on which a computer or a computing device as described herein may implement the example embodiments described herein.

For example, FIG. 12 is a block diagram that illustrates a computer system 1200 upon which an embodiment of the invention may be implemented. Computer system 1200 includes a bus 1202 or other communication mechanism for communicating information, and a hardware processor 1204 coupled with bus 1202 for processing information. Hardware processor 1204 may be, for example, a general purpose microprocessor.

Computer system 1200 also includes a main memory 1206, such as a random access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Such instructions, when stored in non-transitory storage media accessible to processor 1204, render computer system 1200 into a special-purpose machine that is device-specific to perform the operations specified in the instructions.

Computer system 1200 further includes a read only memory (ROM) 1208 or other static storage device coupled to bus 1202 for storing static information and instructions for processor 1204. A storage device 1210, such as a magnetic disk or optical disk, is provided and coupled to bus 1202 for storing information and instructions.

Computer system 1200 may be coupled via bus 1202 to a display 1212, such as a liquid crystal display (LCD), for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

Computer system 1200 may implement the techniques described herein using device-specific hard-wired logic, one or more ASICs or FPGAs, firmware and/or program logic which in combination with the computer system causes or programs computer system 1200 to be a special-purpose machine. According to one embodiment, the techniques herein are performed by computer system 1200 in response to processor 1204 executing one or more sequences of one or more instructions contained in main memory 1206. Such instructions may be read into main memory 1206 from another storage medium, such as storage device 1210. Execution of the sequences of instructions contained in main memory 1206 causes processor 1204 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1210. Volatile media includes dynamic memory, such as main memory 1206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1202. Transmission media can also take the form of acoustic or light waves, such as those generated during radio-wave and infra-red data communications.

Various forms of media may be involved in carrying one or more sequences of one or more instructions to processor 1204 for execution. For example, the instructions may initially be carried on a magnetic disk or solid state drive of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated service digital network (ISDN) card, cable modem, satellite modem, or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the world wide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are example forms of transmission media.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218.

The received code may be executed by processor 1204 as it is received, and/or stored in storage device 1210, or other non-volatile storage for later execution.

12. Equivalents, Extensions, Alternatives and Miscellaneous

In the foregoing specification, example embodiments have been described with reference to numerous specific details that may vary from implementation to implementation. Any definitions expressly set forth herein for terms contained in the claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Various modifications and adaptations to the foregoing example embodiments may become apparent to those skilled in the relevant arts in view of the foregoing description, when it is read in conjunction with the accompanying drawings. Any and all modifications will still fall within the scope of the non-limiting and example embodiments. Furthermore, other example embodiment category forth herein will come to mind to one skilled in the art to which these embodiments pertain having the benefit of the teachings presented in the foregoing descriptions and the drawings.

Accordingly, the present invention may be embodied in any of the forms described herein. For example, the following enumerated example embodiments (EEEs) describe some structures, features, and functionalities of some aspects of the present invention.

EEE 1. A computer-implemented method, comprising: receiving an audio object comprising audio content and object metadata, the object metadata of the audio object indicating an object spatial position of the audio object to be rendered by a plurality of audio speakers in a playback environment, each audio speaker in the plurality of audio speakers being located in a respective source spatial position in a plurality of source spatial positions in the playback environment; determining, based on the object spatial position of the audio object and the plurality of source spatial positions of the plurality of audio speakers, a plurality of initial gain values for the plurality of audio speakers, each audio speaker in the plurality of audio speakers being assigned with a respective initial gain value in the plurality of initial gain values; determining, based on the object spatial position of the audio object and a set of source spatial positions at which the set of audio speakers are respectively located in the playback environment, a set of optimized non-negative gain values for the set of audio speakers; causing the audio object at the object spatial position to be rendered with the set of optimized gain values for the set of audio speakers, each audio speaker in the set of audio speakers being assigned with a respective optimized gain value in the plurality of optimized gain values.

EEE 2. The method as recited in EEE 1, further comprising using one or more negative initial gain values among the plurality of initial gain values to deactivate one or more corresponding audio sources, in the plurality of audio sources in the playback environment, from taking part in rendering the audio object located at the object spatial position.

EEE 3. The method as recited in EEE 1, further comprising using one or more zero and negative initial gain values among the plurality of initial gain values to deactivate one or more corresponding audio sources, in the plurality of audio sources in the playback environment, from taking part in rendering the audio object located at the object spatial position.

EEE 4. The method as recited in EEE 1, further comprising using one or more initial gain values below a gain value threshold among the plurality of initial gain values to deactivate one or more corresponding audio sources, in the plurality of audio sources in the playback environment, from taking part in rendering the audio object located at the object spatial position.

EEE 5. The method as recited in EEE 1, wherein the plurality of initial gain values is generated by a first gain optimizer that generates nonnegative optimized gain values and negative optimized gain values; and wherein the set of initial gain values is generated by a second different gain optimizer that maintains nonnegativity of nonnegative optimized gain values and turns negative gain values nonnegative.

EEE 6. The method as recited in EEE 5, wherein the first gain optimizer represents one of an inverse-matrix gain optimizer, or a gain optimizer that does not preclude negative gain values.

EEE 7. The method as recited in EEE 5, wherein the second gain optimizer represents one of a multiplicative-update gain optimizer, an interior point optimizer, a quadratic-programming gain optimizer, a gradient descent gain optimizer, or a gain optimizer that maintains nonnegativity of nonnegative optimized gain values and turns negative gain values non-negative.

EEE 8. The method as recited in EEE 1, wherein the object spatial position represents a spatial positon in a spatial trajectory of the audio object.

EEE 9. The method as recited in EEE 1, wherein the object spatial position is related to audio content in one of one or more audio frames, or one or more subdivision of an audio frame.

EEE 10. The method as recited in EEE 1, wherein the plurality of initial gain values for the plurality of audio speakers are at least in part derived through interpolating precomputed optimized gain values for the plurality of audio speakers in the playback environment.

EEE 11. The method as recited in EEE 10, wherein the precomputed optimized gain values are a part of a plurality of sets of precomputed optimized gain values for a plurality of precomputed object spatial positions in the playback environment.

EEE 12. The method as recited in EEE 11, wherein the plurality of precomputed object spatial positions in the playback environment is determined based on a specific sparseness setting.

EEE 13. The method as recited in EEE 10, wherein the precomputed optimized gain values are precomputed and stored in a lookup table in offline processing.

EEE 14. The method as recited in EEE 1, further comprising: while in offline processing: selecting, based on one or more selection criteria, a specific sparseness setting from among a plurality of selectable sparseness settings, the specific sparseness setting determining a plurality of precomputed spatial positions in the playback environment; generating a plurality of sets of precomputed optimized gain values for the plurality of precomputed spatial positions, each set of precomputed optimized gain values in the plurality of sets of precomputed optimized gain values corresponding to a respective precomputed spatial position in the plurality of precomputed spatial positions; while in online processing: deriving the plurality of initial gain values for the plurality of audio speakers at least in part from interpolated gain values from the plurality of sets of precomputed optimized gain values.

EEE 15. The method as recited in EEE 14, further comprising: while in the online processing: performing optimization of the interpolated gain values to determine the plurality of initial gain values for the plurality of audio speakers.

EEE 16. The method as recited in EEE 14, wherein the plurality of initial gain values for the plurality of audio speakers are directly set to the interpolated gain values in the online processing.

EEE 17. The method as recited in EEE 1, further comprising using the plurality of initial gain values to select a set of audio speakers from among the plurality of audio speakers.

EEE 18. A media processing system configured to perform any one of the methods recited in EEEs 1-17.

EEE 19. An apparatus comprising a processor and configured to perform any one of the methods recited in EEEs 1-17.

EEE 20. A non-transitory computer readable storage medium, storing software instructions, which when executed by one or more processors cause performance of any one of the methods recited in EEEs 1-17.

It will be appreciated that the embodiments of the invention are not to be limited to the specific embodiments disclosed and that modifications and other embodiments are intended to be included within the scope of the appended claims. Although specific terms are used herein, they are used in a generic and descriptive sense only, and not for purposes of limitation.

The invention claimed is:

1. A computer-implemented method, comprising:

receiving an audio object comprising audio content and object metadata, the object metadata of the audio object indicating an object spatial position of the audio object to be rendered by a plurality of audio speakers, each audio speaker in the plurality of audio speakers being located in a respective source spatial position in a plurality of source spatial positions, wherein the object spatial position is related to audio content in one or more audio frames, or one or more subdivisions of an audio frame;

determining, based on the object spatial position of the audio object and the plurality of source spatial positions of the plurality of audio speakers, a plurality of initial gain values for the plurality of audio speakers, each audio speaker in the plurality of audio speakers being assigned with a respective initial gain value in the plurality of initial gain values;

determining, for each of the plurality of audio speakers, whether a respective audio speaker is an active audio speaker or whether the respective audio speaker is not an active audio speaker, wherein an audio speaker is an active audio speaker if the initial gain value assigned to the audio speaker is above a threshold value, and wherein the audio speaker is not an active audio speaker if the initial gain value assigned to the audio speaker is below or at a threshold value;

determining, based on the object spatial position of the audio object and a set of source spatial positions at which the set of active audio speakers are respectively located, a set of optimized non-negative gain values for the set of active audio speakers, wherein the set of optimized gain values are yielded using the initial gain values of the active speakers as input; and outputting, for each audio speaker in the set of active audio speakers a respective optimized gain value in the plurality of optimized gain values.

2. A system comprising:

one or more processors; and a non-transitory computer-readable medium storing instructions that, when executed by the one or more processors, cause the one or more processors to perform operations of:

receiving an audio object comprising audio content and object metadata, the object metadata of the audio object indicating an object spatial position of the audio object to be rendered by a plurality of audio speakers, each audio speaker in the plurality of audio speakers being located in a respective source spatial position in a plurality of source spatial positions, wherein the object spatial position is related to audio content in one or more audio frames, or one or more subdivisions of an audio frame;

determining, based on the object spatial position of the audio object and the plurality of source spatial positions of the plurality of audio speakers, a plurality of initial gain values for the plurality of audio speakers, each audio speaker in the plurality of audio speakers being assigned with a respective initial gain value in the plurality of initial gain values;

determining, for each of the plurality of audio speakers, whether a respective audio speaker is an active audio speaker or whether the respective audio speaker is not an active audio speaker, wherein an audio speaker is an active audio speaker if the initial gain value assigned to the audio speaker is above a threshold value, and wherein the audio speaker is not an active audio speaker if the initial gain value assigned to the audio speaker is below or at a threshold value;

determining, based on the object spatial position of the audio object and a set of source spatial positions at which the set of active audio speakers are respectively located, a set of optimized non-negative gain values for the set of active audio speakers, wherein the set of optimized gain values are yielded using the initial gain values of the active speakers as input; and outputting, for each audio speaker in the set of active audio speakers a respective optimized gain value in the plurality of optimized gain values.

3. A non-transitory computer-readable medium storing instructions that, when exceed by a processors, cause the one or more processors to perform the operations of:

receiving an audio object comprising audio content and object metadata, the object metadata of the audio object indicating an object spatial position of the audio object to be rendered by a plurality of audio speakers, each audio speaker in the plurality of audio speakers being located in a respective source spatial position in a plurality of source spatial positions, wherein the object spatial position is related to audio content in one or more audio frames, or one or more subdivisions of an audio frame;

determining, based on the object spatial position of the audio object and the plurality of source spatial positions of the plurality of audio speakers, a plurality of initial gain values for the plurality of audio speakers, each audio speaker in the plurality of audio speakers being assigned with a respective initial gain value in the plurality of initial gain values;

determining, for each of the plurality of audio speakers, whether a respective audio speaker is an active audio speaker or whether the respective audio speaker is not an active audio speaker, wherein an audio speaker is an active audio speaker if the initial gain value assigned to the audio speaker is above a threshold value, and wherein the audio speaker is not an active audio speaker if the initial gain value assigned to the audio speaker is below or at a threshold value;

determining, based on the object spatial position of the audio object and a set of source spatial positions at which the set of active audio speakers are respectively located, a set of optimized non-negative gain values for the set of active audio speakers, wherein the set of optimized gain values are yielded using the initial gain values of the active speakers as input; and outputting, for each audio speaker in the set of active audio speakers a respective optimized gain value in the plurality of optimized gain values.

* * * * *